US012610086B2

(12) United States Patent
Nam et al.

(10) Patent No.: US 12,610,086 B2
(45) **Date of Patent: *Apr. 21, 2026**

(54) IMAGE ENCODING/DECODING METHOD AND DEVICE SIGNALING SPS, AND METHOD FOR TRANSMITTING BITSTREAM

(71) Applicant: LG Electronics Inc., Seoul (KR)

(72) Inventors: Jung Hak Nam, Seoul (KR); Hendry Hendry, Seoul (KR); Hyeong Moon Jang, Seoul (KR); Seung Hwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/976,949

(22) Filed: Dec. 11, 2024

(65) Prior Publication Data

US 2025/0106439 A1     Mar. 27, 2025

Related U.S. Application Data

(63) Continuation of application No. 17/916,653, filed as application No. PCT/KR2021/004211 on Apr. 5, 2021, now Pat. No. 12,212,785.

(60) Provisional application No. 63/004,577, filed on Apr. 3, 2020.

(51) Int. Cl.
| | |
|---|---|
| *H04N 19/70* | (2014.01) |
| *H04N 19/30* | (2014.01) |
| *H04N 19/503* | (2014.01) |

(52) U.S. Cl.
CPC ............. *H04N 19/70* (2014.11); *H04N 19/30* (2014.11); *H04N 19/503* (2014.11)

(58) Field of Classification Search
CPC ....... H04N 19/70; H04N 19/30; H04N 19/503
See application file for complete search history.

(56) References Cited

U.S. PATENT DOCUMENTS

2021/0314623 A1* 10/2021 Chang .................. H04N 19/136
2021/0368208 A1* 11/2021 Samuelsson ........... H04N 19/70

* cited by examiner

*Primary Examiner* — Jae N Noh
(74) *Attorney, Agent, or Firm* — Fish & Richardson P.C.

(57) ABSTRACT

An image encoding/decoding method and apparatus are provided. An image decoding method according to the present disclosure is performed by an image decoding apparatus. The image decoding method comprises determining whether a video parameter set (VPS) referenced by a sequence parameter set (SPS) is present, deriving information on inter layer prediction, based on the determination as to whether the video parameter set referenced by the sequence parameter set is present, and reconstructing an image based on the information on inter layer prediction.

8 Claims, 15 Drawing Sheets

FIG. 8

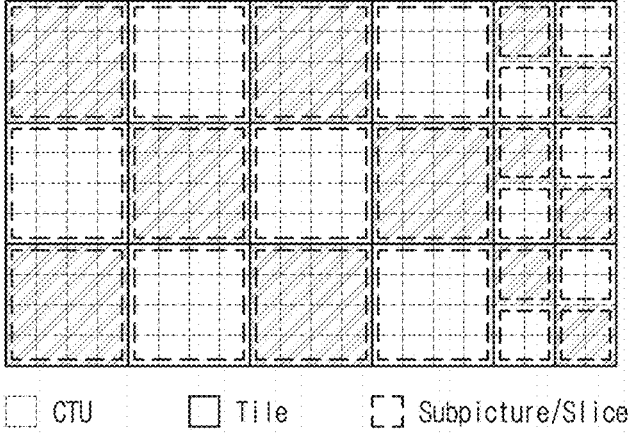

☐ CTU        ☐ Tile        ☐ Subpicture/Slice

FIG. 9

| seq_parameter_set_rbsp( ) { | Descriptor |
|---|---|
| sps_seq_parameter_set_id | u(4) |
| sps_video_parameter_set_id | u(4) |
| ... | u(1) |
| res_change_in_clvs_allowed_flag | u(1) |
| pic_width_max_in_luma_samples | ue(v) |
| pic_height_max_in_luma_samples | ue(v) |
| ... | |
| sps_log2_ctu_size_minus5 | u(2) |
| subpic_info_present_flag | u(1) |
| if( subpic_info_present_flag ) { | |
| sps_num_subpics_minus1 | ue(v) |
| ... | u(1) |
| long_term_ref_pics_flag | u(1) |
| inter_layer_ref_pics_present_flag | u(1) |
| sps_idr_rpl_present_flag | u(1) |
| ... | |
| sps_sign_data_hiding_enabled_flag | u(1) |
| sps_virtual_boundaries_enabled_flag | u(1) |
| if( sps_virtual_boundaries_enabled_flag ) { | |
| sps_virtual_boundaries_present_flag | u(1) |
| if( sps_virtual_boundaries_present_flag ) { | |
| sps_num_ver_virtual_boundaries | u(2) |
| for( i = 0; i < sps_num_ver_virtual_boundaries; i++ ) | |
| sps_virtual_boundaries_pos_x[ i ] | u(13) |
| sps_num_hor_virtual_boundaries | u(2) |
| for( i = 0; i < sps_num_hor_virtual_boundaries; i++ ) | |
| sps_virtual_boundaries_pos_y[ i ] | u(13) |

FIG. 10

| seq_parameter_set_rbsp( ) { | Descriptor |
|---|---|
|   sps_seq_parameter_set_id | u(4) |
|   sps_video_parameter_set_id | u(4) |
|   ... | |
|   res_change_in_clvs_allowed_flag | u(1) |
|   pic_width_max_in_luma_samples | ue(v) |
|   pic_height_max_in_luma_samples | ue(v) |
|   ... | |
|   if(!res_change_in_clvs_allowed_flag){ | |
|     subpic_info_present_flag | u(1) |
|     if( subpic_info_present_flag ) { | |
|       sps_num_subpics_minus1 | ue(v) |
|       sps_independent_subpics_flag | u(1) |
|       for( i = 0; sps_num_subpics_minus1 > 0 && i <= sps_num_subpics_minus1; i++ ) { | |
|         if( i > 0 && pic_width_max_in_luma_samples > CtbSizeY ) | |
|           subpic_ctu_top_left_x[ i ] | u(v) |
|         if( i > 0 && pic_height_max_in_luma_samples > CtbSizeY ) { | |
|           subpic_ctu_top_left_y[ i ] | u(v) |
|         if( i < sps_num_subpics_minus1 && <br>           pic_width_max_in_luma_samples > CtbSizeY ) | |
|           subpic_width_minus1[ i ] | u(v) |
|         if( i < sps_num_subpics_minus1 && <br>           pic_height_max_in_luma_samples > CtbSizeY ) | |
|           subpic_height_minus1[ i ] | u(v) |
|         if( !sps_independent_subpics_flag) { | |
|           subpic_treated_as_pic_flag[ i ] | u(1) |
|           loop_filter_across_subpic_enabled_flag[ i ] | u(1) |
|         } | |
|     } | |

FIG. 11

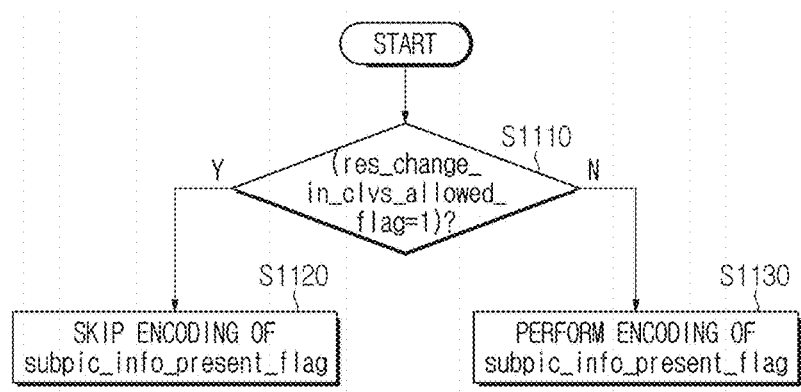

FIG. 13

| seq_parameter_set_rbsp( ) { | Descriptor |
|---|---|
|    sps_seq_parameter_set_id | u(4) |
|    sps_video_parameter_set_id | u(4) |
|    ... | |
|    res_change_in_clvs_allowed_flag | u(1) |
|    pic_width_max_in_luma_samples | ue(v) |
|    pic_height_max_in_luma_samples | ue(v) |
|    sps_conformance_window_flag | u(1) |
|    if( sps_conformance_window_flag ) { | |
|      sps_conf_win_left_offset | ue(v) |
|      sps_conf_win_right_offset | ue(v) |
|      sps_conf_win_top_offset | ue(v) |
|      sps_conf_win_bottom_offset | ue(v) |
|    } | |
|    sps_log2_ctu_size_minus5 | u(2) |
|    ... | |
|    if( !res_change_in_clvs_allowed_flag ) | |
|    sps_virtual_boundaries_enabled_flag | u(1) |
|    if( sps_virtual_boundaries_enabled_flag ) { | |
|      sps_virtual_boundaries_present_flag | u(1) |
|      if( sps_virtual_boundaries_present_flag ) { | |
|        sps_num_ver_virtual_boundaries | u(2) |
|        for( i = 0; i < sps_num_ver_virtual_boundaries; i++ ) | |
|         sps_virtual_boundaries_pos_x[ i ] | u(13) |
|        sps_num_hor_virtual_boundaries | u(2) |
|        for( i = 0; i < sps_num_hor_virtual_boundaries; i++ ) | |
|         sps_virtual_boundaries_pos_y[ i ] | u(13) |
|      } | |
|    } | |
|    ... | |
| } | |

FIG. 16

| seq_parameter_set_rbsp( ) { | Descriptor |
|---|---|
| sps_seq_parameter_set_id | u(4) |
| sps_video_parameter_set_id | u(4) |
| ... | u(1) |
| res_change_in_clvs_allowed_flag | u(1) |
| pic_width_max_in_luma_samples | ue(v) |
| pic_height_max_in_luma_samples | ue(v) |
| ... | |
| sps_virtual_boundaries_enabled_flag | u(1) |
| if( sps_virtual_boundaries_enabled_flag && !res_change_in_clvs_allowed_flag ) { | |
| sps_virtual_boundaries_present_flag | u(1) |
| if( sps_virtual_boundaries_present_flag ) { | |
| sps_num_ver_virtual_boundaries | u(2) |
| for( i = 0; i < sps_num_ver_virtual_boundaries; i++ ) | |
| sps_virtual_boundaries_pos_x[ i ] | u(13) |
| sps_num_hor_virtual_boundaries | u(2) |
| for( i = 0; i < sps_num_hor_virtual_boundaries; i++ ) | |
| sps_virtual_boundaries_pos_y[ i ] | u(13) |
| } | |
| } | |
| ... | |
| } | |

FIG. 17 pic_width_in_luma_samples specifies the width of each decoded picture referring to the PPS in units of luma samples. pic_width_in_luma_samples shall not be equal to 0, shall be an integer multiple of Max( 8, MinCbSizeY ), and shall be less than or equal to pic_width_max_in_luma_samples.

~~When res_change_in_clvs_allowed_flag equal to 0, the value of pic_width_in_luma_samples shall be equal to pic_width_max_in_luma_samples.~~ pic_height_in_luma_samples specifies the height of each decoded picture referring to the PPS in units of luma samples. pic_height_in_luma_samples shall not be equal to 0 and shall be an integer multiple of Max( 8, MinCbSizeY ), and shall be less than or equal to pic_height_max_in_luma_samples.

~~When res_change_in_clvs_allowed_flag equal to 0, the value of pic_height_in_luma_samples shall be equal to pic_height_max_in_luma_samples.~~

...

scaling_window_explicit_signalling_flag equal to 1 specifies that the scaling window offset parameters are present in the PPS. scaling_window_explicit_signalling_flag equal to 0 specifies that the scaling window offset parameters are not present in the PPS. ~~When res_change_in_clvs_allowed_flag is equal to 0, the value of scaling_window_explicit_signalling_flag shall be equal to 0.~~

When scaling_window_explicit_signalling_flag is equal to 0 and pic_width_in_luma_samples is equal to pic_width_max_in_luma_samples     and     pic_height_in_luma_samples     is     equal     to pic_height_max_in_luma_samples, the value of res_change_in_clvs_allowed_flag shall be equal to 0.

| seq_parameter_set_rbsp( ) { | Descriptor |
|---|---|
|    sps_seq_parameter_set_id | u(4) |
|    sps_video_parameter_set_id | u(4) |
|    sps_max_sublayers_minus1 | u(3) |
|    ... | u(4) |
|    res_change_in_clvs_allowed_flag | u(1) |
|    pic_width_max_in_luma_samples | ue(v) |
|    pic_height_max_in_luma_samples | ue(v) |
|    sps_conformance_window_flag | u(1) |
|    ... | u(1) |
| if( sps_video_parameter_set_id ) | |
|    inter_layer_ref_pics_present_flag | u(1) |
|    ... | |
| } | |

IMAGE ENCODING/DECODING METHOD AND DEVICE SIGNALING SPS, AND METHOD FOR TRANSMITTING BITSTREAM

CROSS-REFERENCE TO RELATED APPLICATIONS

This application is a continuation of U.S. application Ser. No. 17/916,653, filed on Oct. 3, 2022, which is a National Stage application under 35 U.S.C. § 371 of International Application No. PCT/KR2021/004211, filed on Apr. 5, 2021, which claims the benefit of U.S. Provisional Application No. 63/004,577, filed on Apr. 3, 2020. The disclosures of the prior applications are hereby incorporated by reference herein in their entirety.

TECHNICAL FIELD

The present disclosure relates to an image encoding/decoding method and apparatus and a method of transmitting a bitstream, and, more particularly, to an image encoding/decoding method and apparatus for signaling a sequence parameter set (SPS), and a method of transmitting a bitstream generated by the image encoding method/apparatus of the present disclosure.

BACKGROUND ART

Recently, demand for high-resolution and high-quality images such as high definition (HD) images and ultra high definition (UHD) images is increasing in various fields. As resolution and quality of image data are improved, the amount of transmitted information or bits relatively increases as compared to existing image data. An increase in the amount of transmitted information or bits causes an increase in transmission cost and storage cost.

Accordingly, there is a need for high-efficient image compression technology for effectively transmitting, storing and reproducing information on high-resolution and high-quality images.

DISCLOSURE

Technical Problem

An object of the present disclosure is to provide an image encoding/decoding method and apparatus with improved encoding/decoding efficiency.

Another object of the present disclosure is to provide an image encoding/decoding method and apparatus for efficiently signaling an SPS.

Another object of the present disclosure is to provide a method of transmitting a bitstream generated by an image encoding method or apparatus according to the present disclosure.

Another object of the present disclosure is to provide a recording medium storing a bitstream generated by an image encoding method or apparatus according to the present disclosure.

Another object of the present disclosure is to provide a recording medium storing a bitstream received, decoded and used to reconstruct an image by an image decoding apparatus according to the present disclosure.

The technical problems solved by the present disclosure are not limited to the above technical problems and other technical problems which are not described herein will become apparent to those skilled in the art from the following description.

Technical Solution

An image decoding method according to an aspect of the present disclosure may comprise determining whether a video parameter set (VPS) referenced by a sequence parameter set (SPS) is present, deriving information on inter layer prediction, based on the determination as to whether the video parameter set referenced by the sequence parameter set is present, and reconstructing an image based on the information on inter layer prediction.

In the image decoding method according to the present disclosure, the determining whether the video parameter set referenced by the sequence parameter set is present may be performed based on an identifier value of the video parameter set referenced by the sequence parameter set.

In the image decoding method according to the present disclosure, based on the identifier value of the video parameter set referenced by the sequence parameter set being 0, it may be determined that the video parameter set referenced by the sequence parameter set is not present.

In the image decoding method according to the present disclosure, based on the identifier value of the video parameter set referenced by the sequence parameter set being greater than 0, it may be determined that the video parameter set referenced by the sequence parameter set is present.

In the image decoding method according to the present disclosure, based on the determination result that the video parameter set referenced by the sequence parameter set is not present, the information on inter layer prediction may not be obtained from a bitstream and may be derived as a predetermined value.

In the image decoding method according to the present disclosure, based on the determination result that the video parameter set referenced by the sequence parameter set is present, the information on inter layer prediction may be obtained from a bitstream.

An image decoding apparatus according to another aspect of the present disclosure may comprise a memory and at least one processor. The at least one processor may determine whether a video parameter set (VPS) referenced by a sequence parameter set (SPS) is present, derive information on inter layer prediction, based on the determination as to whether the video parameter set referenced by the sequence parameter set is present, and reconstruct an image based on the information on inter layer prediction.

An image encoding method according to another aspect of the present disclosure may comprise determining whether a video parameter set (VPS) referenced by a sequence parameter set (SPS) is present, deriving information on inter layer prediction based on the determination as to whether the video parameter set referenced by the sequence parameter set is present, and encoding the information on inter layer prediction.

In the image encoding method according to the present disclosure, the determining whether the video parameter set referenced by the sequence parameter set is present may be performed based on an identifier value of the video parameter set referenced by the sequence parameter set.

In the image encoding method according to the present disclosure, based on the identifier value of the video parameter set referenced by the sequence parameter set being 0, it may be determined that the video parameter set referenced by the sequence parameter set is not present.

In the image encoding method according to the present disclosure, based on the identifier value of the video parameter set referenced by the sequence parameter set being greater than 0, it may be determined that the video parameter set referenced by the sequence parameter set is present.

In the image encoding method according to the present disclosure, based on the determination result that the video parameter set referenced by the sequence parameter set is not present, the information on inter layer prediction may not be encoded and may be derived as a predetermined value.

In the image encoding method according to the present disclosure, based on the determination result that the video parameter set referenced by the sequence parameter set is present, the information on inter layer prediction may be encoded.

In addition, a computer-readable recording medium according to another aspect of the present disclosure may store the bitstream generated by the image encoding apparatus or the image encoding method of the present disclosure.

The features briefly summarized above with respect to the present disclosure are merely exemplary aspects of the detailed description below of the present disclosure, and do not limit the scope of the present disclosure.

Advantageous Effects

According to the present disclosure, it is possible to provide an image encoding/decoding method and apparatus with improved encoding/decoding efficiency.

According to the present disclosure, it is possible to provide an image encoding/decoding method and apparatus for efficiently signaling an SPS.

Also, according to the present disclosure, it is possible to provide a method of transmitting a bitstream generated by an image encoding method or apparatus according to the present disclosure.

Also, according to the present disclosure, it is possible to provide a recording medium storing a bitstream generated by an image encoding method or apparatus according to the present disclosure.

Also, according to the present disclosure, it is possible to provide a recording medium storing a bitstream received, decoded and used to reconstruct an image by an image decoding apparatus according to the present disclosure.

It will be appreciated by persons skilled in the art that that the effects that can be achieved through the present disclosure are not limited to what has been particularly described hereinabove and other advantages of the present disclosure will be more clearly understood from the detailed description.

DESCRIPTION OF DRAWINGS

FIG. 8 is a view illustrating splitting of a picture into subpictures according to the present disclosure.

FIG. 9 is a view illustrating signaling of a syntax element related to resolution change in a conventional coded layer video sequence (CLVS), subpicture information, virtual boundary information and information on inter layer prediction.

FIG. 10 is a view illustrating signaling of a syntax element related to resolution change in a coded layer video sequence (CLVS) and subpicture information according to the present disclosure.

FIG. 11 is a view illustrating a process of encoding subpic_info_present_flag based on the syntax structure of FIG. 10.

FIG. 13 is a view illustrating signaling of a syntax element related to resolution change in a CLVS and virtual boundary information according to the present disclosure.

FIG. 16 is a view illustrating signaling of a syntax element related to resolution change in a CLVS and virtual boundary information according to another embodiment of the present disclosure.

FIG. 17 is a view illustrating changed constraints for syntax elements related to resolution change in a CLVS, a width and height of a picture in units of luma samples and a scaling offset parameter according to the present disclosure.

MODE FOR INVENTION

Figure 1:
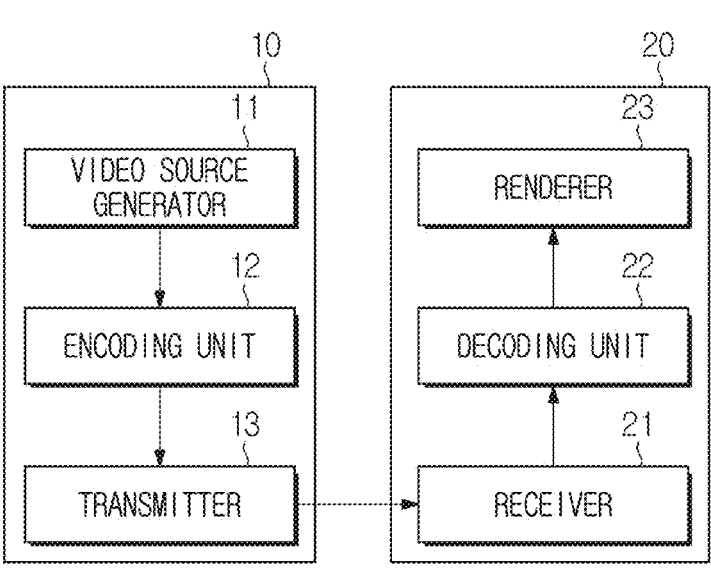
FIG. 1 is a view schematically illustrating a video coding system, to which an embodiment of the present disclosure is applicable.

Hereinafter, the embodiments of the present disclosure will be described in detail with reference to the accompanying drawings so as to be easily implemented by those skilled in the art. However, the present disclosure may be implemented in various different forms, and is not limited to the embodiments described herein.

In describing the present disclosure, if it is determined that the detailed description of a related known function or construction renders the scope of the present disclosure unnecessarily ambiguous, the detailed description thereof will be omitted. In the drawings, parts not related to the description of the present disclosure are omitted, and similar reference numerals are attached to similar parts.

In the present disclosure, when a component is "connected", "coupled" or "linked" to another component, it may include not only a direct connection relationship but also an indirect connection relationship in which an intervening component is present. In addition, when a component "includes" or "has" other components, it means that other components may be further included, rather than excluding other components unless otherwise stated.

In the present disclosure, the terms first, second, etc. may be used only for the purpose of distinguishing one component from other components, and do not limit the order or importance of the components unless otherwise stated. Accordingly, within the scope of the present disclosure, a first component in one embodiment may be referred to as a second component in another embodiment, and similarly, a second component in one embodiment may be referred to as a first component in another embodiment.

In the present disclosure, components that are distinguished from each other are intended to clearly describe each feature, and do not mean that the components are necessarily separated. That is, a plurality of components may be integrated and implemented in one hardware or software unit, or one component may be distributed and implemented in a plurality of hardware or software units. Therefore, even if not stated otherwise, such embodiments in which the components are integrated or the component is distributed are also included in the scope of the present disclosure.

In the present disclosure, the components described in various embodiments do not necessarily mean essential components, and some components may be optional components. Accordingly, an embodiment consisting of a subset of components described in an embodiment is also included in the scope of the present disclosure. In addition, embodiments including other components in addition to components described in the various embodiments are included in the scope of the present disclosure.

The present disclosure relates to encoding and decoding of an image, and terms used in the present disclosure may have a general meaning commonly used in the technical field, to which the present disclosure belongs, unless newly defined in the present disclosure.

In the present disclosure, a "picture" generally refers to a unit representing one image in a specific time period, and a slice/tile is a coding unit constituting a part of a picture, and one picture may be composed of one or more slices/tiles. In addition, a slice/tile may include one or more coding tree units (CTUs).

In the present disclosure, a "pixel" or a "pel" may mean a smallest unit constituting one picture (or image). In addition, "sample" may be used as a term corresponding to a pixel. A sample may generally represent a pixel or a value of a pixel, and may represent only a pixel/pixel value of a luma component or only a pixel/pixel value of a chroma component.

In the present disclosure, a "unit" may represent a basic unit of image processing. The unit may include at least one of a specific region of the picture and information related to the region. The unit may be used interchangeably with terms such as "sample array", "block" or "area" in some cases. In a general case, an M×N block may include samples (or sample arrays) or a set (or array) of transform coefficients of M columns and N rows.

In the present disclosure, "current block" may mean one of "current coding block", "current coding unit", "coding target block", "decoding target block" or "processing target block". When prediction is performed, "current block" may mean "current prediction block" or "prediction target block". When transform (inverse transform)/quantization (dequantization) is performed, "current block" may mean "current transform block" or "transform target block". When filtering is performed, "current block" may mean "filtering target block".

In the present disclosure, the term "/" and "," should be interpreted to indicate "and/or." For instance, the expression "A/B" and "A, B" may mean "A and/or B." Further, "A/B/C" and "A/B/C" may mean "at least one of A, B, and/or C."

In the present disclosure, the term "or" should be interpreted to indicate "and/or." For instance, the expression "A or B" may comprise 1) only "A", 2) only "B", and/or 3) both "A and B". In other words, in the present disclosure, the term "or" should be interpreted to indicate "additionally or alternatively."

Overview of Video Coding System

FIG. 1 is a view showing a video coding system according to the present disclosure.

The video coding system according to an embodiment may include a encoding apparatus 10 and a decoding apparatus 20. The encoding apparatus 10 may deliver encoded video and/or image information or data to the decoding apparatus 20 in the form of a file or streaming via a digital storage medium or network.

The encoding apparatus 10 according to an embodiment may include a video source generator 11, an encoding unit 12 and a transmitter 13. The decoding apparatus 20 according to an embodiment may include a receiver 21, a decoding unit 22 and a renderer 23. The encoding unit 12 may be called a video/image encoding unit, and the decoding unit 22 may be called a video/image decoding unit. The transmitter 13 may be included in the encoding unit 12. The receiver 21 may be included in the decoding unit 22. The renderer 23 may include a display and the display may be configured as a separate device or an external component.

The video source generator 11 may acquire a video/image through a process of capturing, synthesizing or generating the video/image. The video source generator 11 may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding unit 12 may encode an input video/image. The encoding unit 12 may perform a series of procedures such as prediction, transform, and quantization for compression and coding efficiency. The encoding unit 12 may output encoded data (encoded video/image information) in the form of a bitstream.

The transmitter 13 may transmit the encoded video/image information or data output in the form of a bitstream to the receiver 21 of the decoding apparatus 20 through a digital storage medium or a network in the form of a file or streaming. The digital storage medium may include various storage mediums such as USB, SD, CD, DVD, Blu-ray, HDD, SSD, and the like. The transmitter 13 may include an element for generating a media file through a predetermined file format and may include an element for transmission through a broadcast/communication network. The receiver 21 may extract/receive the bitstream from the storage medium or network and transmit the bitstream to the decoding unit 22.

The decoding unit 22 may decode the video/image by performing a series of procedures such as dequantization, inverse transform, and prediction corresponding to the operation of the encoding unit 12.

The renderer 23 may render the decoded video/image. The rendered video/image may be displayed through the display.

Overview of Image Encoding Apparatus

Figure 2:
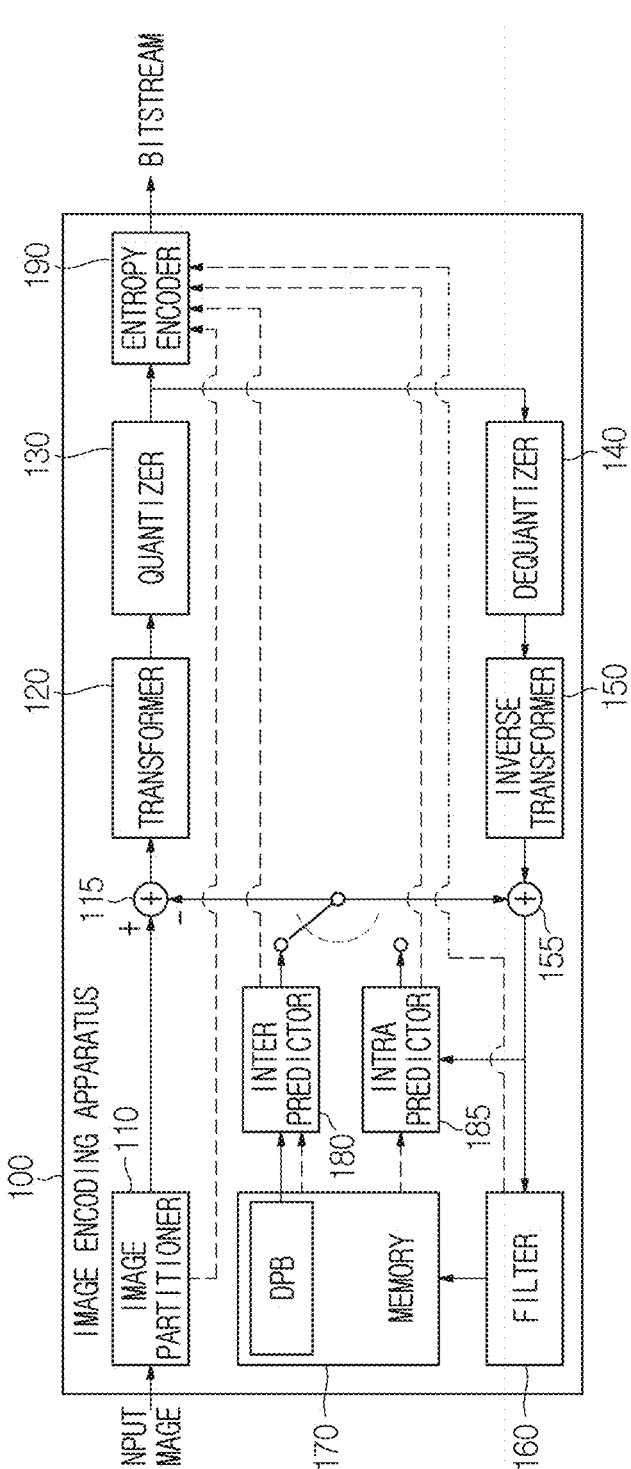
FIG. 2 is a view schematically illustrating an image encoding apparatus, to which an embodiment of the present disclosure is applicable.

FIG. 2 is a view schematically showing an image encoding apparatus, to which an embodiment of the present disclosure is applicable.

As shown in FIG. 2, the image encoding apparatus 100 may include an image partitioner 110, a subtractor 115, a transformer 120, a quantizer 130, a dequantizer 140, an inverse transformer 150, an adder 155, a filter 160, a memory 170, an inter prediction unit 180, an intra prediction unit 185 and an entropy encoder 190. The inter prediction unit 180 and the intra prediction unit 185 may be collectively referred to as a "prediction unit". The transformer 120, the quantizer 130, the dequantizer 140 and the inverse transformer 150 may be included in a residual processor. The residual processor may further include the subtractor 115.

All or at least some of the plurality of components configuring the image encoding apparatus 100 may be configured by one hardware component (e.g., an encoder or a processor) in some embodiments. In addition, the memory 170 may include a decoded picture buffer (DPB) and may be configured by a digital storage medium.

The image partitioner 110 may partition an input image (or a picture or a frame) input to the image encoding apparatus 100 into one or more processing units. For example, the processing unit may be called a coding unit (CU). The coding unit may be acquired by recursively partitioning a coding tree unit (CTU) or a largest coding unit (LCU) according to a quad-tree binary-tree ternary-tree (QT/BT/TT) structure. For example, one coding unit may be partitioned into a plurality of coding units of a deeper depth based on a quad tree structure, a binary tree structure, and/or a ternary structure. For partitioning of the coding unit, a quad tree structure may be applied first and the binary tree structure and/or ternary structure may be applied later. The coding procedure according to the present disclosure may be performed based on the final coding unit that is no longer partitioned. The largest coding unit may be used as the final coding unit or the coding unit of deeper depth acquired by partitioning the largest coding unit may be used as the final coding unit. Here, the coding procedure may include a procedure of prediction, transform, and reconstruction, which will be described later. As another example, the processing unit of the coding procedure may be a prediction unit (PU) or a transform unit (TU). The prediction unit and the transform unit may be split or partitioned from the final coding unit. The prediction unit may be a unit of sample prediction, and the transform unit may be a unit for deriving a transform coefficient and/or a unit for deriving a residual signal from the transform coefficient.

The prediction unit (the inter prediction unit 180 or the intra prediction unit 185) may perform prediction on a block to be processed (current block) and generate a predicted block including prediction samples for the current block. The prediction unit may determine whether intra prediction or inter prediction is applied on a current block or CU basis. The prediction unit may generate various information related to prediction of the current block and transmit the generated information to the entropy encoder 190. The information on the prediction may be encoded in the entropy encoder 190 and output in the form of a bitstream.

The intra prediction unit 185 may predict the current block by referring to the samples in the current picture. The referred samples may be located in the neighborhood of the current block or may be located apart according to the intra prediction mode and/or the intra prediction technique. The intra prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra prediction unit 185 may determine the prediction mode applied to the current block by using a prediction mode applied to a neighboring block.

The inter prediction unit 180 may derive a predicted block for the current block based on a reference block (reference sample array) specified by a motion vector on a reference picture. In this case, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi-prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like. The reference picture including the temporal neighboring block may be called a collocated picture (colPic). For example, the inter prediction unit 180 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter prediction unit 180 may use motion information of the neighboring block as motion information of the current block. In the case of the skip mode, unlike the merge mode, the residual signal may not be transmitted. In the case of the motion vector prediction (MVP) mode, the motion vector of the neighboring block may be used as a motion vector predictor, and the motion vector of the current block may be signaled by encoding a motion vector difference and an indicator for a motion vector predictor. The motion vector difference may mean a difference between the motion vector of the current block and the motion vector predictor.

The prediction unit may generate a prediction signal based on various prediction methods and prediction techniques described below. For example, the prediction unit may not only apply intra prediction or inter prediction but also simultaneously apply both intra prediction and inter prediction, in order to predict the current block. A prediction method of simultaneously applying both intra prediction and inter prediction for prediction of the current block may be called combined inter and intra prediction (CIIP). In addition, the prediction unit may perform intra block copy (IBC) for prediction of the current block. Intra block copy may be used for content image/video coding of a game or the like, for example, screen content coding (SCC). IBC is a method of predicting a current picture using a previously reconstructed reference block in the current picture at a location apart from the current block by a predetermined distance. When IBC is applied, the location of the reference block in the current picture may be encoded as a vector (block vector) corresponding to the predetermined distance.

The prediction signal generated by the prediction unit may be used to generate a reconstructed signal or to generate a residual signal. The subtractor 115 may generate a residual signal (residual block or residual sample array) by subtracting the prediction signal (predicted block or prediction sample array) output from the prediction unit from the input image signal (original block or original sample array). The generated residual signal may be transmitted to the transformer 120.

The transformer 120 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform acquired based on a prediction signal generated using all previously reconstructed pixels. In addition, the transform process may be applied to square pixel blocks having the same size or may be applied to blocks having a variable size rather than square.

The quantizer 130 may quantize the transform coefficients and transmit them to the entropy encoder 190. The entropy encoder 190 may encode the quantized signal (information on the quantized transform coefficients) and output a bitstream. The information on the quantized transform coefficients may be referred to as residual information. The quantizer 130 may rearrange quantized transform coefficients in a block form into a one-dimensional vector form based on a coefficient scanning order and generate information on the quantized transform coefficients based on the quantized transform coefficients in the one-dimensional vector form.

The entropy encoder 190 may perform various encoding methods such as, for example, exponential Golomb, context-adaptive variable length coding (CAVLC), context-adaptive binary arithmetic coding (CABAC), and the like. The entropy encoder 190 may encode information necessary for video/image reconstruction other than quantized transform coefficients (e.g., values of syntax elements, etc.) together or separately. Encoded information (e.g., encoded video/image information) may be transmitted or stored in units of network abstraction layers (NALs) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. The signaled information, transmitted information and/or syntax elements described in the present disclosure may be encoded through the above-described encoding procedure and included in the bitstream.

The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 190 and/or a storage unit (not shown) storing the signal may be included as internal/external element of the image encoding apparatus 100. Alternatively, the transmitter may be provided as the component of the entropy encoder 190.

The quantized transform coefficients output from the quantizer 130 may be used to generate a residual signal. For example, the residual signal (residual block or residual samples) may be reconstructed by applying dequantization and inverse transform to the quantized transform coefficients through the dequantizer 140 and the inverse transformer 150.

The adder 155 adds the reconstructed residual signal to the prediction signal output from the inter prediction unit 180 or the intra prediction unit 185 to generate a reconstructed signal (reconstructed picture, reconstructed block, reconstructed sample array). If there is no residual for the block to be processed, such as a case where the skip mode is applied, the predicted block may be used as the reconstructed block. The adder 155 may be called a reconstructor or a reconstructed block generator. The generated reconstructed signal may be used for intra prediction of a next block to be processed in the current picture and may be used for inter prediction of a next picture through filtering as described below.

Meanwhile, as described below, luma mapping with chroma scaling (LMCS) is applicable in a picture encoding process.

The filter 160 may improve subjective/objective image quality by applying filtering to the reconstructed signal. For example, the filter 160 may generate a modified reconstructed picture by applying various filtering methods to the reconstructed picture and store the modified reconstructed picture in the memory 170, specifically, a DPB of the memory 170. The various filtering methods may include, for example, deblocking filtering, a sample adaptive offset, an adaptive loop filter, a bilateral filter, and the like. The filter 160 may generate various information related to filtering and transmit the generated information to the entropy encoder 190 as described later in the description of each filtering method. The information related to filtering may be encoded by the entropy encoder 190 and output in the form of a bitstream.

The modified reconstructed picture transmitted to the memory 170 may be used as the reference picture in the inter prediction unit 180. When inter prediction is applied through the image encoding apparatus 100, prediction mismatch between the image encoding apparatus 100 and the image decoding apparatus may be avoided and encoding efficiency may be improved.

The DPB of the memory 170 may store the modified reconstructed picture for use as a reference picture in the inter prediction unit 180. The memory 170 may store the motion information of the block from which the motion information in the current picture is derived (or encoded) and/or the motion information of the blocks in the picture that have already been reconstructed. The stored motion information may be transmitted to the inter prediction unit 180 and used as the motion information of the spatial neighboring block or the motion information of the temporal neighboring block. The memory 170 may store reconstructed samples of reconstructed blocks in the current picture and may transfer the reconstructed samples to the intra prediction unit 185.

Overview of Image Decoding Apparatus

Figure 3:
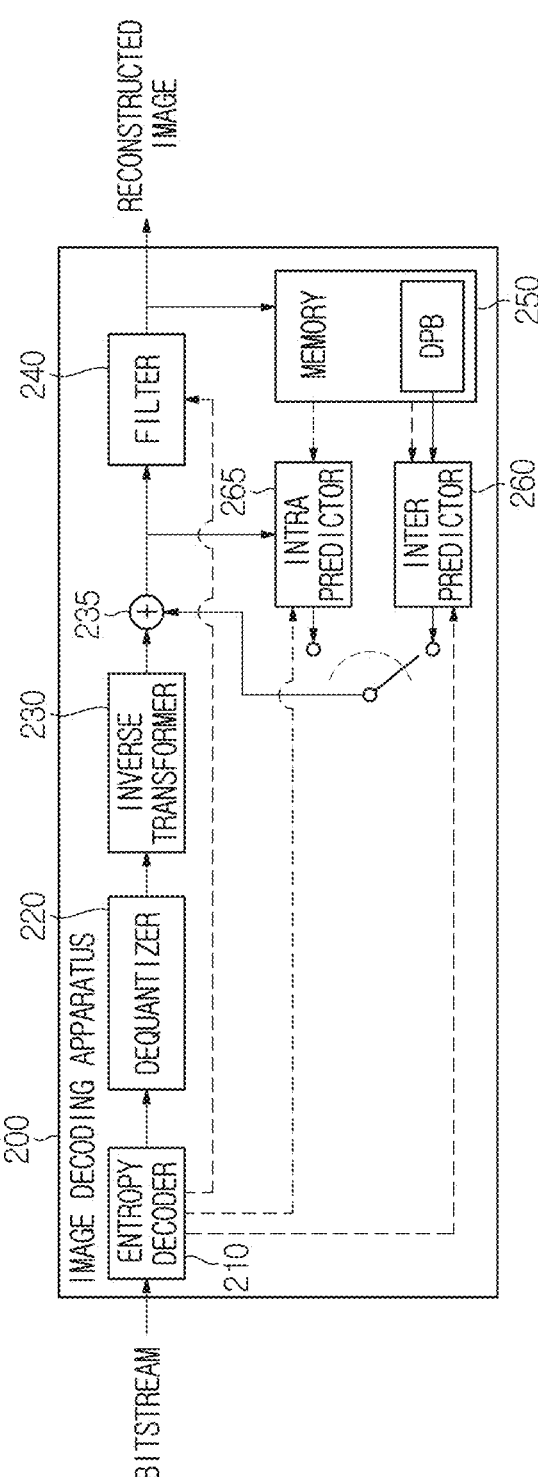
FIG. 3 is a view schematically illustrating an image decoding apparatus, to which an embodiment of the present disclosure is applicable.

FIG. 3 is a view schematically showing an image decoding apparatus, to which an embodiment of the present disclosure is applicable.

As shown in FIG. 3, the image decoding apparatus 200 may include an entropy decoder 210, a dequantizer 220, an inverse transformer 230, an adder 235, a filter 240, a memory 250, an inter prediction unit 260 and an intra prediction unit 265. The inter prediction unit 260 and the intra prediction unit 265 may be collectively referred to as a "prediction unit". The dequantizer 220 and the inverse transformer 230 may be included in a residual processor.

All or at least some of a plurality of components configuring the image decoding apparatus 200 may be configured by a hardware component (e.g., a decoder or a processor) according to an embodiment. In addition, the memory 250 may include a decoded picture buffer (DPB) or may be configured by a digital storage medium.

The image decoding apparatus 200, which has received a bitstream including video/image information, may reconstruct an image by performing a process corresponding to a process performed by the image encoding apparatus 100 of FIG. 2. For example, the image decoding apparatus 200 may perform decoding using a processing unit applied in the image encoding apparatus. Thus, the processing unit of decoding may be a coding unit, for example. The coding unit may be acquired by partitioning a coding tree unit or a largest coding unit. The reconstructed image signal decoded and output through the image decoding apparatus 200 may be reproduced through a reproducing apparatus (not shown).

The image decoding apparatus 200 may receive a signal output from the image encoding apparatus of FIG. 2 in the form of a bitstream. The received signal may be decoded through the entropy decoder 210. For example, the entropy decoder 210 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The image decoding apparatus may further decode picture based on the information on the parameter set and/or the general constraint information. Signaled/received information and/or syntax elements described in the present disclosure may be decoded through the decoding procedure and obtained from the bitstream. For example, the entropy decoder 210 decodes the information in the bitstream based on a coding method such as exponential Golomb coding, CAVLC, or CABAC, and output values of syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a neighboring block and a decoding target block or information of a symbol/bin decoded in a previous stage, and perform arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 210 may be provided to the prediction unit (the inter prediction unit 260 and the intra prediction unit 265), and the residual value on which the entropy decoding was performed in the entropy decoder 210, that is, the quantized transform coefficients and related parameter information, may be input to the dequantizer 220. In addition, information on filtering among information decoded by the entropy decoder 210 may be provided to the filter 240. Meanwhile, a receiver (not shown) for receiving a signal output from the image encoding apparatus may be further configured as an internal/external element of the image decoding apparatus 200, or the receiver may be a component of the entropy decoder 210.

Meanwhile, the image decoding apparatus according to the present disclosure may be referred to as a video/image/picture decoding apparatus. The image decoding apparatus may be classified into an information decoder (video/image/picture information decoder) and a sample decoder (video/image/picture sample decoder). The information decoder may include the entropy decoder 210. The sample decoder may include at least one of the dequantizer 220, the inverse transformer 230, the adder 235, the filter 240, the memory 250, the inter prediction unit 260 or the intra prediction unit 265.

The dequantizer 220 may dequantize the quantized transform coefficients and output the transform coefficients. The dequantizer 220 may rearrange the quantized transform coefficients in the form of a two-dimensional block. In this case, the rearrangement may be performed based on the coefficient scanning order performed in the image encoding apparatus. The dequantizer 220 may perform dequantization on the quantized transform coefficients by using a quantization parameter (e.g., quantization step size information) and obtain transform coefficients.

The inverse transformer 230 may inversely transform the transform coefficients to obtain a residual signal (residual block, residual sample array).

The prediction unit may perform prediction on the current block and generate a predicted block including prediction samples for the current block. The prediction unit may determine whether intra prediction or inter prediction is applied to the current block based on the information on the prediction output from the entropy decoder 210 and may determine a specific intra/inter prediction mode (prediction technique).

It is the same as described in the prediction unit of the image encoding apparatus 100 that the prediction unit may generate the prediction signal based on various prediction methods (techniques) which will be described later.

The intra prediction unit 265 may predict the current block by referring to the samples in the current picture. The description of the intra prediction unit 185 is equally applied to the intra prediction unit 265.

The inter prediction unit 260 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi-prediction, etc.) information. In the case of inter prediction, the neighboring block may include a spatial neighboring block present in the current picture and a temporal neighboring block present in the reference picture. For example, the inter prediction unit 260 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 235 may generate a reconstructed signal (reconstructed picture, reconstructed block, reconstructed sample array) by adding the obtained residual signal to the prediction signal (predicted block, predicted sample array) output from the prediction unit (including the inter prediction unit 260 and/or the intra prediction unit 265). The description of the adder 155 is equally applicable to the adder 235.

Meanwhile, as described below, luma mapping with chroma scaling (LMCS) is applicable in a picture decoding process.

The filter 240 may improve subjective/objective image quality by applying filtering to the reconstructed signal. For example, the filter 240 may generate a modified reconstructed picture by applying various filtering methods to the reconstructed picture and store the modified reconstructed picture in the memory 250, specifically, a DPB of the memory 250. The various filtering methods may include, for example, deblocking filtering, a sample adaptive offset, an adaptive loop filter, a bilateral filter, and the like.

The (modified) reconstructed picture stored in the DPB of the memory 250 may be used as a reference picture in the inter prediction unit 260. The memory 250 may store the motion information of the block from which the motion information in the current picture is derived (or decoded) and/or the motion information of the blocks in the picture that have already been reconstructed. The stored motion information may be transmitted to the inter prediction unit 260 so as to be utilized as the motion information of the spatial neighboring block or the motion information of the temporal neighboring block. The memory 250 may store reconstructed samples of reconstructed blocks in the current picture and transfer the reconstructed samples to the intra prediction unit 265.

In the present disclosure, the embodiments described in the filter 160, the inter prediction unit 180, and the intra prediction unit 185 of the image encoding apparatus 100 may be equally or correspondingly applied to the filter 240, the inter prediction unit 260, and the intra prediction unit 265 of the image decoding apparatus 200.

Hereinafter, inter prediction encoding and inter prediction decoding will be described with reference to FIGS. 4 to 7.

An image encoding apparatus/image decoding apparatus may perform inter prediction in units of blocks to derive a prediction sample. Inter prediction may mean prediction derived in a manner that is dependent on data elements of picture(s) other than a current picture. When inter prediction applies to the current block, a predicted block for the current block may be derived based on a reference block specified by a motion vector on a reference picture.

In this case, in order to reduce the amount of motion information transmitted in an inter prediction mode, motion information of the current block may be derived based on correlation of motion information between a neighboring block and the current block, and motion information may be derived in units of blocks, subblocks or samples. The motion information may include a motion vector and a reference picture index. The motion information may further include inter prediction type information. Here, the inter prediction type information may mean directional information of inter prediction. The inter prediction type information may indicate that a current block is predicted using one of L0 prediction, L1 prediction or Bi-prediction.

When applying inter prediction to the current block, the neighboring block of the current block may include a spatial neighboring block present in the current picture and a temporal neighboring block present in the reference picture. A reference picture including the reference block for the current block and a reference picture including the temporal neighboring block may be the same or different. The temporal neighboring block may be referred to as a collocated reference block or collocated CU (colCU), and the reference picture including the temporal neighboring block may be referred to as a collocated picture (colPic).

Meanwhile, a motion information candidate list may be constructed based on the neighboring blocks of the current block, and, in this case, flag or index information indicating which candidate is used may be signaled in order to derive the motion vector of the current block and/or the reference picture index.

The motion information may include L0 motion information and/or L1 motion information according to the inter prediction type. The motion vector in an L0 direction may be defined as an L0 motion vector or MVL0, and the motion vector in an L1 direction may be defined as an L1 motion vector or MVL1. Prediction based on the L0 motion vector may be defined as L0 prediction, prediction based on the L1 motion vector may be defined as L1 prediction, and prediction based both the L0 motion vector and the L1 motion vector may be defined as Bi-prediction. Here, the L0 motion vector may mean a motion vector associated with a reference picture list L0 and the L1 motion vector may mean a motion vector associated with a reference picture list L1.

The reference picture list L0 may include pictures before the current picture in output order as reference pictures, and the reference picture list L1 may include pictures after the current picture in output order. The previous pictures may be defined as forward (reference) pictures and the subsequent pictures may be defined as backward (reference) pictures. Meanwhile, the reference picture list L0 may further include pictures after the current picture in output order as reference pictures. In this case, within the reference picture list L0, the previous pictures may be first indexed and the subsequent pictures may then be indexed. The reference picture list L1 may further include pictures before the current picture in output order as reference pictures. In this case, within the reference picture list L1, the subsequent pictures may be first indexed and the previous pictures may then be indexed. Here, the output order may correspond to picture order count (POC) order.

Figure 4:
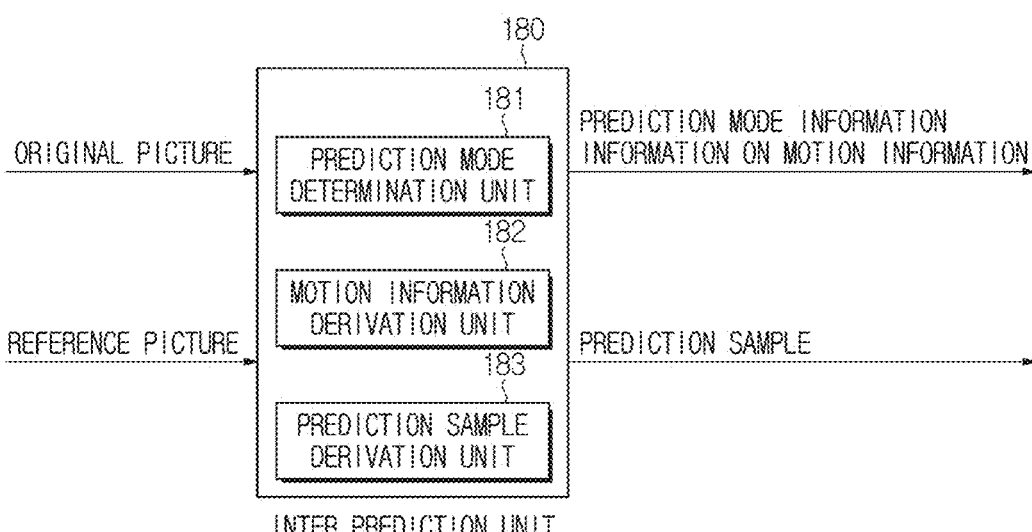
FIG. 4 is a view exemplarily illustrating a configuration of an inter prediction unit for performing inter prediction encoding according to the present disclosure.

FIG. 4 is a view exemplarily illustrating a configuration of an inter prediction unit for performing inter prediction encoding according to the present disclosure.

For example, the inter prediction unit shown in FIG. 4 may correspond to the inter prediction unit 180 of the image encoding apparatus of FIG. 2. The inter prediction unit 180 according to the present disclosure may include a prediction mode determination unit 181, a motion information derivation unit 182 and a prediction sample derivation unit 183.

The inter prediction unit 180 may receive an original picture to be encoded and a reference picture to be used for inter prediction as input. The prediction mode determination unit 181 may determine a prediction mode for a current block in the original picture. The motion information derivation unit 182 may derive motion information of the current block. The prediction sample derivation unit 183 may derive prediction samples by performing inter prediction with respect to the current block. The prediction samples may be expressed as a prediction block of the current block. The inter prediction unit 180 may output information on the prediction mode, information on the motion information and the prediction samples.

For example, the inter prediction unit 180 of the image encoding apparatus may search for a block similar to the current block within a predetermined area (search area) of reference pictures through motion estimation, and derive a reference block whose difference from the current block is equal to or less than a predetermined criterion or a minimum. Based on this, a reference picture index indicating a reference picture in which the reference block is located may be derived, and a motion vector may be derived based on a position difference between the reference block and the current block. The image encoding apparatus may determine a mode applying to the current block among various inter prediction modes. The image encoding apparatus may compare rate-distortion (RD) costs for the various prediction modes and determine an optimal inter prediction mode of the current block. However, the method of determining the inter prediction mode of the current block by the image encoding apparatus is not limited to the above example, and various methods may be used.

For example, the inter prediction mode of the current block may be determined to be at least one of a merge mode, a merge skip mode, a motion vector prediction (MVP) mode, a symmetric motion vector difference (SMVD) mode, an affine mode, a subblock-based merge mode, an adaptive motion vector resolution (AMVR) mode, a history-based motion vector predictor (HMVP) mode, a pair-wise average merge mode, a merge mode with motion vector differences (MMVD) mode, a decoder side motion vector refinement (DMVR) mode, a combined inter and intra prediction (CIIP) mode or a geometric partitioning mode (GPM).

For example, when a skip mode or a merge mode applies to the current block, the image encoding apparatus may derive merge candidates from neighboring blocks of the current block and construct a merge candidate list using the derived merge candidates. In addition, the image encoding apparatus may derive a reference block whose difference from the current block is equal to or less than a predetermined criterion or a minimum, among reference blocks indicated by merge candidates included in the merge candidate list. In this case, a merge candidate associated with the derived reference block may be selected, and merge index information indicating the selected merge candidate may be generated and signaled to an image decoding apparatus. The motion information of the current block may be derived using the motion information of the selected merge candidate.

As another example, when an MVP mode applies to the current block, the image encoding apparatus may derive motion vector predictor (MVP) candidates from the neighboring blocks of the current block and construct an MVP candidate list using the derived MVP candidates. In addition, the image encoding apparatus may use the motion vector of the MVP candidate selected from among the MVP candidates included in the MVP candidate list as the MVP of the current block. In this case, for example, the motion vector indicating the reference block derived by the above-described motion estimation may be used as the motion vector of the current block, an MVP candidate with a motion vector having a smallest difference from the motion vector of the current block among the MVP candidates may be the selected MVP candidate. A motion vector difference (MVD) which is a difference obtained by subtracting the MVP from the motion vector of the current block may be derived. In this case, index information indicating the selected MVP candidate and information on the MVD may be signaled to the image decoding apparatus. In addition, when applying the MVP mode, the value of the reference picture index may be constructed as reference picture index information and separately signaled to the image decoding apparatus.

Figure 5:
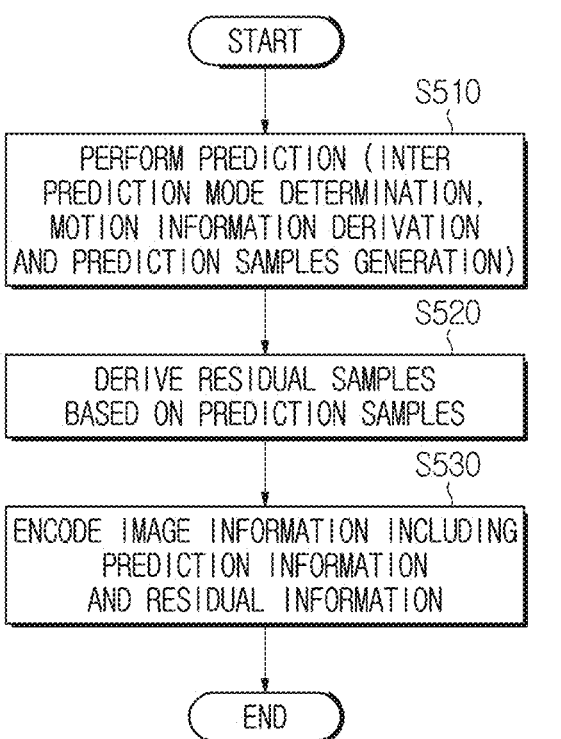
FIG. 5 is a flowchart illustrating an encoding method based on inter prediction.

FIG. 5 is a flowchart illustrating an encoding method based on inter prediction.

For example, the encoding method of FIG. 5 may be performed by the image encoding apparatus of FIG. 2. Specifically, step S510, step S520 and step S530 may be performed by the inter prediction unit 180, the residual processor (for example, the subtractor) and the entropy encoder 190, respectively. In this case, prediction information and residual information to be encoded may be derived by the inter prediction unit 180 and the residual processor, respectively. The residual information may include information on quantized transform coefficients for the residual samples. As described above, the residual samples may be derived as transform coefficients through the transformer 120 of the image encoding apparatus, and the transform coefficient may be derived as quantized transform coefficients through the quantizer 130. Information on the quantized transform coefficients may be encoded by the entropy encoder 190 through a residual coding procedure.

In step S510, the image encoding apparatus may perform inter prediction for the current block. The image encoding apparatus may derive an inter prediction mode for the current block and the motion information of the current block by performing inter prediction, and generate the prediction samples of the current block. Here, a procedure for determining the inter prediction mode, the procedure for deriving the motion information and the procedure for generating the prediction samples may be simultaneously performed or any one thereof may be performed before the other procedures.

In step S520, the image encoding apparatus may derive residual samples based on the prediction samples. The image encoding apparatus may derive the residual samples through original samples of the current block and the prediction samples. For example, the residual sample may be derived by subtracting a corresponding prediction sample from an original sample.

In step S530, the image encoding apparatus may encode image information including prediction information and residual information. The image encoding apparatus may output the encoded image information in the form of a bitstream. The prediction information may include prediction mode information (e.g., skip flag, merge flag or mode index, etc.) and information on motion information as information related to the prediction procedure. Among the prediction mode information, the skip flag indicates whether a skip mode applies to the current block, and the merge flag indicates whether the merge mode applies to the current block. Alternatively, the prediction mode information may indicate one of a plurality of prediction modes, such as a mode index. When the skip flag and the merge flag are 0, it may be determined that the MVP mode applies to the current block. The information on the motion information may include candidate selection information (e.g., merge index, mvp flag or mvp index) which is information for deriving a motion vector. Among the candidate selection information, the merge index may be signaled when the merge mode applies to the current block and may be information for selecting one of merge candidates included in a merge candidate list. Among the candidate selection information, the MVP flag or the MVP index may be signaled when the MVP mode applies to the current block and may be information for selecting one of MVP candidates in an MVP candidate list. Specifically, the MVP flag may be signaled using a syntax element mvp_10_flag or mvp_11_flag. In addition, the information on the motion information may include information on the above-described MVD and/or reference picture index information. In addition, the information on the motion information may include information indicating whether to apply L0 prediction, L1 prediction or Bi-prediction. The residual information is information on the residual samples. The residual information may include information on quantized transform coefficients for the residual samples.

The output bitstream may be stored in a (digital) storage medium and transmitted to the image decoding apparatus or may be transmitted to the image decoding apparatus via a network.

As described above, the image encoding apparatus may generate a reconstructed picture (a picture including reconstructed samples and a reconstructed block) based on the reference samples and the residual samples. This is for the image encoding apparatus to derive the same prediction result as that performed by the image decoding apparatus, thereby increasing coding efficiency. Accordingly, the image encoding apparatus may store the reconstructed picture (or the reconstructed samples and the reconstructed block) in a memory and use the same as a reference picture for inter prediction. As described above, an in-loop filtering procedure is further applicable to the reconstructed picture.

Figure 6:
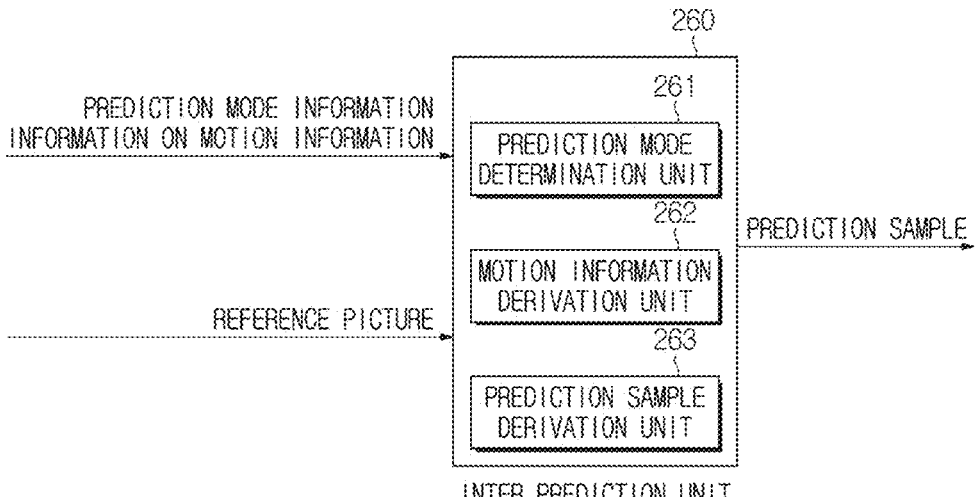
FIG. 6 is a view exemplarily illustrating a configuration of an inter prediction unit for performing inter prediction decoding according to the present disclosure.

FIG. 6 is a view exemplarily illustrating a configuration of an inter prediction unit for performing inter prediction decoding according to the present disclosure.

For example, the inter prediction unit shown in FIG. 6 may correspond to the inter prediction unit 260 of the image decoding apparatus of FIG. 3. The inter prediction unit 260 according to the present disclosure may include a prediction mode determination unit 261, a motion information derivation unit 262 and a prediction sample derivation unit 263. The inter prediction unit 260 may receive information on the prediction mode of a current block, information on motion information of the current block and a reference picture to be used for inter prediction as input. The prediction mode determination unit 261 may determine a prediction mode for the current block based on the information on the prediction mode. The motion information derivation unit 262 may derive motion information (motion vector and/or reference picture index) of the current block based on the information on the motion information. The prediction sample derivation unit 263 may derive prediction samples by performing inter prediction with respect to the current block. The prediction samples may be expressed as a prediction block of the current block. The inter prediction unit 260 may output the derived prediction samples.

Figure 7:
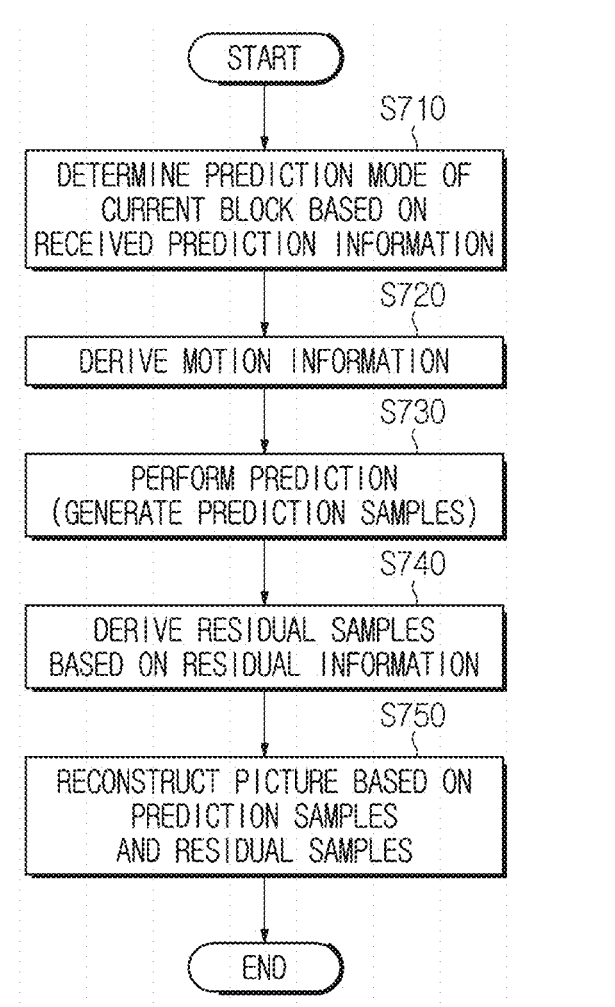
FIG. 7 is a flowchart illustrating a decoding method based on inter prediction.

FIG. 7 is a flowchart illustrating a decoding method based on inter prediction.

For example, the decoding method of FIG. 7 may be performed by the image decoding apparatus of FIG. 3. The image decoding apparatus may perform operation corresponding to operation performed by the image encoding apparatus. The image decoding apparatus may perform prediction with respect to a current block based on received prediction information and derive prediction samples.

Specifically, steps S710 to S730 may be performed by the inter prediction unit 260, and the prediction information of step S710 and the residual information of step S740 may be obtained from a bitstream by the entropy decoder 210. Step S740 may be performed by the residual processor of the image decoding apparatus. Specifically, the dequantizer 220 of the residual processor may perform dequantization based on quantized transform coefficients derived based on the residual information to derive transform coefficients, and the inverse transformer 230 of the residual processor may perform inverse transform with respect to the transform coefficients to derive the residual samples for the current block. Step S750 may be performed by the adder 235 or the reconstructor.

In step S710, the image decoding apparatus may determine the prediction mode of the current block based on the received prediction information. The image decoding apparatus may determine which inter prediction mode applies to the current block based on the prediction mode information in the prediction information.

For example, it may be determined whether the skip mode applies to the current block based on the skip flag. In addition, it may be determined whether the merge mode or the MVP mode applies to the current block based on the merge flag. Alternatively, one of various inter prediction mode candidates may be selected based on the mode index. The inter prediction mode candidates may include a skip mode, a merge mode and/or an MVP mode or may include various inter prediction modes which will be described below.

In step S720, the image decoding apparatus may derive the motion information of the current block based on the determined inter prediction mode. For example, when the skip mode or the merge mode applies to the current block, the image decoding apparatus may construct a merge candidate list, which will be described below, and select one of merge candidates included in the merge candidate list. The selection may be performed based on the above-described candidate selection information (merge index). The motion information of the current block may be derived using motion information of the selected merge candidate. For example, the motion information of the selected merge candidate may be used as the motion information of the current block.

As another example, when the MVP mode applies to the current block, the image decoding apparatus may construct an MVP candidate list and use the motion vector of an MVP candidate selected from among MVP candidates included in the MVP candidate list as an MVP of the current block. The selection may be performed based on the above-described candidate selection information (mvp flag or mvp index). In this case, the MVD of the current block may be derived based on information on the MVD, and the motion vector of the current block may be derived based on MVP and MVD of the current block. In addition, the reference picture index of the current block may be derived based on the reference picture index information. A picture indicated by the reference picture index in the reference picture list of the current block may be derived as a reference picture referenced for inter prediction of the current block.

In step S730, the image decoding apparatus may generate prediction samples of the current block based on motion information of the current block (S630). In this case, the reference picture may be derived based on the reference picture index of the current block, and the prediction samples of the current block may be derived using the samples of the reference block indicated by the motion vector of the current block on the reference picture. In some cases, a prediction sample filtering procedure may be further performed with respect to all or some of the prediction samples of the current block.

In step S740, the image decoding apparatus may generate residual samples of the current block based the received residual information.

In step S750, the image decoding apparatus may generate the reconstructed samples of the current block based on the prediction samples and the residual samples and generate a reconstructed picture based on this. Thereafter, an in-loop filtering procedure is further applicable to the reconstructed picture.

FIG. 8 is a view illustrating splitting of a picture into subpictures according to the present disclosure.

A picture may be split into one or more tile rows and one or more tile columns. A tile may consist of a plurality of CTUs in a rectangular area of a picture. A slice may consist of a plurality of tiles. In addition, a tile of a picture may consist of a plurality of CTUs. The slice may correspond to a raster scan slice mode and a rectangular slice mode. In the rectangular slice mode, the slice may include a plurality of tiles collectively forming a rectangular area of a picture. In addition, the slice may include a plurality of consecutive CTUs collectively forming a rectangular area of a picture. Tiles in the rectangular slice may be scanned in a raster scan order within the rectangular area. A subpicture may include one or more slices which collectively occupy the rectangular area of the picture.

Referring to FIG. 8, the picture may be split into 18 tiles. Each of 12 tiles on the left in the picture may consist of 4×4 CTUs. Each of six tiles on the right in the picture may consist of two slices. Each slice may consist of 2×2 CTUs. That is, the picture may consist of 24 slices. In addition, the picture may consist of 24 subpictures.

FIG. 9 is a view illustrating signaling of syntax elements related to resolution change and subpicture information in a conventional coded layer video sequence (CLVS), virtual boundary information and information on inter layer prediction.

According to image compression technology, adaptive resolution change (ARC) of the CLVS may be supported. When ARC is used, a reference picture having resolution different from that of a current picture may be resampled. In this case, the reference picture may be a picture included in the same layer as a current layer including the current picture. Resampling may be referred to as reference picture resampling (RPR). For example, when ARC is allowed, inter prediction may be performed based on the reference picture having different resolution. The reference picture may have a width and/or height of a luma sample different from that of the current picture. The reference picture may be resampled for inter prediction. The prediction sample of the current block in the current picture may be derived based on a motion vector of the current block and the resampled reference picture.

Hereinafter, syntax and semantics in a sequence parameter set (SPS) specified for encoding and decoding of a bitstream will be described in detail with reference to FIG. 9.

Referring to FIG. 9, information (e.g., res_change_in_clvs_allowed_flag) specifying whether resolution may be changed in the CLVS may be signaled. res_change_in_ clvs_allowed_flag of a first value (e.g., 1) may specify that picture spatial resolution may be changed within the CLVS referencing the SPS. In addition, res_change_in_clvs_allowed_flag of a second value (e.g., 0) may specify that picture spatial resolution may not be changed within the CLVS referencing the SPS.

In addition, referring to FIG. 9, information (e.g., subpic_info_present_flag) specifying whether subpicture information for the CLVS is present and whether one or more subpicture is present in each picture of the CLVS may be signaled. subpic_info_present_flag of a first value (e.g., 1) may specify that subpicture information for the CLVS is present. In addition, subpic_info_present_flag of a first value (e.g., 1) may specify that one or more subpictures may be present in each picture of the CLVS. In addition, subpic_info_present_flag of a second value (e.g., 0) may specify that subpicture information for the CLVS is not present. In addition, subpic_info_present_flag of a second value (e.g., 0) may specify that only one subpicture is present in each picture of the CLVS.

As a constraint (Constraint 1) related to res_change_in_clvs_allowed_flag, when res_change_in_clvs_allowed_flag represents a first value (e.g., 1), subpic_info_present_flag may be constrained to be equal to a second value (e.g., 0). Constraint 1 may mean that, when ARC is applied, the subpicture may not be used. That is, when res_change_in_clvs_allowed_flag represents a first value (e.g., 1), subpic_info_present_flag of a second value (e.g., 0) may be signaled. Accordingly, when res_change_in_clvs_allowed_flag represents a first value (e.g., 1), signaling of subpicture related syntax may not be required. However, in FIG. 9, since subpic_info_present_flag is signaled regardless of res_change_in_clvs_allowed_flag, subpic_info_present_flag of a first value (e.g., 1) may be signaled even when res_change_in_clvs_allowed_flag has a first value (e.g., 1).

In addition, referring to FIG. 9, information (e.g., sps_virtual_boundaries_enabled_flag) specifying whether to apply disabling of in-loop filtering across a virtual boundary in a coded picture in the CLVS may be signaled. sps_virtual_boundaries_enabled_flag of a first value (e.g., 1) may specify that disabling of in-loop filtering across the virtual boundary in the coded picture in the CLVS is applicable. In addition, sps_virtual_boundaries_enabled_flag of a second value (e.g., 0) may specify that disabling of in-loop filtering across the virtual boundary in the coded picture in the CLVS is not applied. In this case, in-loop filtering may include at least one of deblocking filtering, sample adaptive offset filter or adaptive loop filter. When sps_virtual_boundaries_enabled_flag is not signaled through a bitstream (not present), the value thereof may be inferred as a second value (e.g., 0).

In addition, referring to FIG. 9, information (e.g., sps_virtual_boundaries_present_flag) specifying whether information on the virtual boundary is signaled in the SPS may be signaled. sps_virtual_boundaries_present_flag of a first value (e.g., 1) may specify that the information on the virtual boundary is signaled in the SPS. In addition, sps_virtual_boundaries_present_flag of a second value (e.g., 0) may specify that the information on the virtual boundary is not signaled in the SPS. When one or more virtual boundaries are signaled in the SPS, in-loop filtering operation across the virtual boundary in the picture referencing the SPS may be disabled. As described above, in-loop filtering may include at least one of deblocking filtering, sample adaptive offset filter or adaptive loop filter.

As constraint (Constraint 2) related to res_change_in_clvs_allowed_flag, when res_change_in_clvs_allowed_flag represents a first value (e.g., 1), sps_virtual_boundaries_present_flag may be constrained to be equal to a second value (e.g., 0). Constraint 2 may mean that, when ARC is applied, information on the virtual boundary may not be present in the SPS. That is, when res_change_in_clvs_allowed_flag represents a first value (e.g., 1), sps_virtual_boundaries_present_flag of a second value (e.g., 0) may be signaled. Accordingly, when res_change_in_clvs_allowed_flag represents a first value (e.g., 1), signaling in the SPS for virtual boundary related syntax may not be required. However, in FIG. 9, since sps_virtual_boundaries_present_flag is signaled regardless of res_change_in_clvs_allowed_flag, sps_virtual_boundaries_present_flag of a first value (e.g., 1) may be signaled even when res_change_in_clvs_allowed_flag has a first value (e.g., 1).

Meanwhile, when ARC is used, a scaling rate shall be derived to represent changed resolution in a PPS (Picture Parameter Set). The scaling rate may be calculated using a size of a picture and scaling window information signaled in the PPS. Here, the following constraints may be present between a syntax element in the PPS and res_change_in_clvs_allowed_flag.

Specifically, information (e.g., pic_width_in_luma_samples) specifying the width in units of luma samples of each reconstructed picture referencing the PPS may be signaled. pic_width_in_luma_samples may not be equal to 0 and shall corresponding to an integer multiple of Max (8, MinCbSizeY). In addition, pic_width_in_luma_samples shall be equal to or less than pic_width_max_in_luma_samples. In this case, when res_change_in_clvs_allowed_flag represents a second value (e.g., 0), the value of pic_width_in_luma_samples may be constrained to be equal to pic_width_max_in_luma_samples (Constraint 3).

In addition, information (e.g., pic_height_in_luma_samples) specifying a height in units of luma samples of each reconstructed picture referencing the PPS may be signaled. pic_height_in_luma_samples may not be equal to 0 and shall correspond to an integer multiple of Max (8, MinCbSizeY). In addition, pic_height_in_luma_samples shall be equal to or less than pic_height_max_in_luma_samples. In this case, when res_change_in_clvs_allowed_flag represents a second value (e.g., 0), the value of pic_height_in_luma_samples may be constrained to be equal to pic_height_max_in_luma_samples (Constraint 3).

In the above, when ARC is not allowed in the SPS, the size of a picture signaled in the PPS shall be equal to that of a picture signaled in the SPS. In the above, ARC being allowed may not mean that there is a dependency between the SPS and the PPS. This may mean that sharing of a parameter set is prohibited in some cases (e.g., when sub-pictures or multiple layers have different resolutions without ARC application).

In addition, information (e.g., scaling_window_explicit_signalling_flag) specifying that scaling window offset parameters are present in a PPS may be signaled, for example, through the PPS. scaling_window_explicit_signalling_flag of a first value (e.g., 1) may specify that scaling window offset parameters are present in the PPS. In addition, scaling_window_explicit_signalling_flag of a second value (e.g., 0) may specify that scaling window offset parameters are not present in the PPS. In this case, when res_change_in_clvs_allowed_flag represents a second value (e.g., 0), the value of scaling_window_explicit_signalling_flag may be constrained to be equal to 0 (Constraint 4).

In the above, when ARC is not allowed in the SPS, scaling window information in the PPS don't have to be signaled. That is, the value of scaling_window_explicit_signalling_flag may be constrained to be equal to 0.

According to the conventional signaling method described with reference to FIG. 9, inaccurate signaling in which Constraint 1 and Constraint 2 are not accurately reflected may be performed. In addition, Constraint 3 and Constraint 4 may cause inaccurate signaling.

In addition, referring to FIG. 9, information (e.g., sps_video_parameter_set_id) specifying a video parameter set identifier referenced by the SPS may be signaled.

In addition, information (e.g., inter_layer_ref_pics_present_flag) on inter layer prediction may be signaled. inter_layer_ref_pics_present_flag of a first value (e.g., 1) may specify that inter layer reference pictures (ILRPs) may be used for inter prediction of one or more coded pictures in the CLVS. In addition, inter_layer_ref_pics_present_flag of a second value (e.g., 0) may specify that an inter layer reference picture is not used for inter prediction of the coded picture in the CLVS. When sps_video_parameter_set_id represents 0, inter_layer_ref_pics_present_flag may be inferred as a second value (e.g., 0). In addition, when a layer referencing the corresponding SPS is an independent layer (when vps_independent_layer_flag[GeneralLayerIdx[nuh_layer_id]] is equal to 1), inter_layer_ref_pics_present_flag may be constrained to be equal to a second value (e.g., 0).

As described above, in case of inter_layer_ref_pics_present_flag, for example, although it has a predetermined value depending on the value of sps_video_parameter_set_id, according to the syntax structure of FIG. 9, inaccurate signaling may be performed. In the above, although inter_layer_ref_pics_present_flag is described as an example of information on inter layer prediction, the present disclosure is not limited thereto and, for example, information on inter layer prediction may include information specifying whether inter layer prediction is enabled or disabled.

An embodiment of the present disclosure for solving at least one of the above-described problems may include at least one of the following configurations. The following configurations may be implemented alone or in combination with other configurations.

Configuration 1: When picture spatial resolution is changed in the CLVS referencing the SPS (e.g., res_change_in_clvs_allowed_flag represents a first value (e.g., 1)), at least one of the following syntax elements may not be signaled.

subpic_info_present_flag sps_virtual_boundaries_enabled_flag

According to Configuration 1 above, the case in which res_change_in_clvs_allowed_flag and subpic_info_present_ flag simultaneously have a first value (e.g., 1) may be prevented. In addition, a case in which res_change_in_clvs_allowed_flag and sps_virtual_boundaries_present_flag (or sps_virtual_boundaries_enabled_flag) simultaneously have a first value (e.g., 1) may be prevented.

Configuration 2: Even when picture spatial resolution is not changed in the CLVS referencing the SPS (e.g., res_change_in_clvs_allowed_flag is a second value (e.g., 0)), pic_width_in_luma_samples in the PPS and pic_width_max_in_luma_samples in the SPS may be different. Similarly, even when picture spatial resolution is not changed in the CLVS referencing the SPS (e.g., res_change_in_clvs_allowed_flag is a second value (e.g., 0)), pic_height_in_luma_samples in the PPS and pic_height_max_in_luma_samples in the SPS may be different. That is, according to Configuration 2, it may be changed such that Constraint 3 is not applied. In addition, it may be changed such that Constraint 4 is not applied. That is, even when picture spatial resolution is not changed in the CLVS referencing the SPS (e.g., res_change_in_clvs_allowed_flag is a second value (e.g., 0)), scaling_window_explicit_signalling_flag may have a value other than a second value (e.g., 0).

Configuration 3: When a video parameter set referenced by the SPS is not present (e.g., sps_video_parameter_set_id is 0), information (e.g., information specifying presence of an inter layer reference picture, inter_layer_ref_pics_present_flag) on inter layer prediction may be constrained not to be signaled. That is, only when sps_video_parameter_set_id is not 0, information (e.g., inter_layer_ref_pics_present_flag) on inter layer prediction may be signaled.

FIG. 10 is a view illustrating signaling of a syntax element related to resolution change in a coded layer video sequence (CLVS) and subpicture information according to the present disclosure.

FIG. 10 illustrates an example in which the signaling structure described with reference to FIG. 9 is partially changed.

Accordingly, descriptions of the same parts in FIGS. 9 and 10 will be omitted.

In FIG. 10, subpic_info_present_flag may be conditionally signaled based on res_change_in_clvs_allowed_flag. For example, when res_change_in_clvs_allowed_flag is a first value (e.g., 1), subpic_info_present_flag may not be signaled. When subpic_info_present_flag is not signaled, the corresponding value may be inferred as a second value (e.g., 0). In addition, when res_change_in_clvs_allowed_flag is a second value (e.g., 0), subpic_info_present_flag may be signaled.

FIG. 11 is a view illustrating a process of encoding subpic_info_present_flag based on the syntax structure of FIG. 10.

Referring to FIG. 11, whether res_change_in_clvs_allowed_flag represents a first value (e.g., 1) may be determined (S1110). When the above condition is satisfied (S1110—YES), subpic_info_present_flag may not be encoded (S1120). When subpic_info_present_flag is not encoded, the corresponding value may be inferred as a second value (e.g., 0).

When the condition of step S1110 is not satisfied (S1110—No), subpic_info_present_flag may be encoded (S1130).

Figure 12:
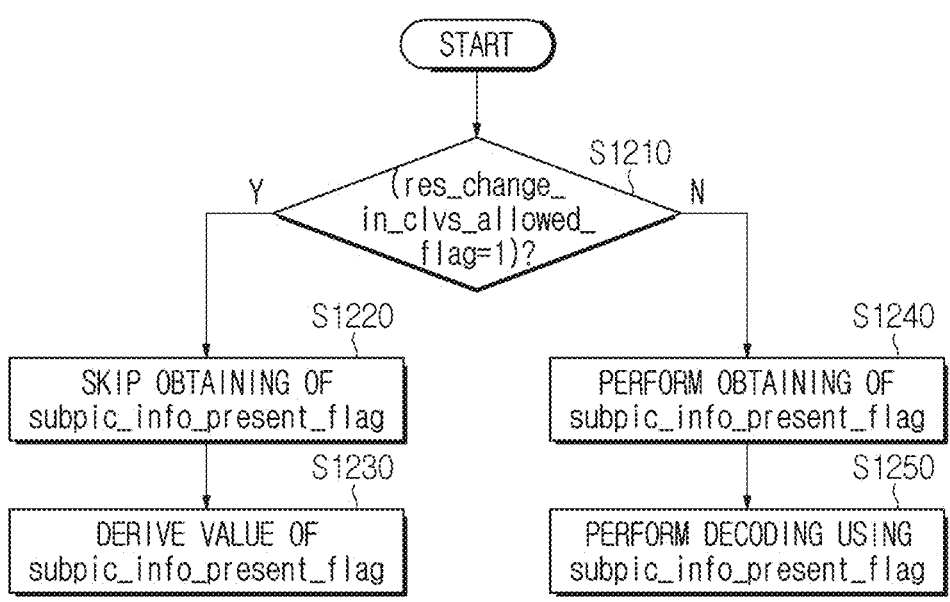
FIG. 12 is a view illustrating a process of decoding subpic_info_present_flag based on the syntax structure of FIG. 10.

FIG. 12 is a view illustrating a process of decoding subpic_info_present_flag based on the syntax structure of FIG. 10.

Referring to FIG. 12, whether res_change_in_clvs_allowed_flag represents a first value (e.g., 1) may be determined (S1210). When the above condition is satisfied (S1210—YES), subpic_info_present_flag may not be obtained from a bitstream (S1220). In addition, subpic_info_present_flag may be derived as a second value (e.g., 0) (S1230)

When the condition of step S1210 is not satisfied (S1210—No), subpic_info_present_flag may be obtained from a bitstream (S1240). In addition, decoding may be performed using subpic_info_present_flag (S1250).

FIG. 13 is a view illustrating signaling of a syntax element related to resolution change in a CLVS and virtual boundary information according to the present disclosure.

FIG. 13 illustrates an example in which the signaling structure described with reference to FIG. 9 is partially changed.

Accordingly, descriptions of the same parts in FIGS. 9 and 13 will be omitted.

Referring to FIG. 13, sps_virtual_boundaries_enabled_flag may be conditionally signaled based on res_change_in_ clvs_allowed_flag. For example, when first value (e.g., 1), res_change_in_clvs_allowed_flag is a sps_virtual_boundaries_enabled_flag may not be signaled. When sps_virtual_boundaries_enabled_flag is not signaled, the corresponding value may be inferred as a second value (e.g., 0). In addition, when res_change_in_clvs_allowed_flag is a second value (e.g., 0), sps_virtual_boundaries_enabled_flag may be signaled. In addition, when sps_virtual_boundaries_enabled_flag is a first value (e.g., 1), sps_virtual_boundaries_present_flag may be signaled. In addition, when sps_virtual_boundaries_enabled_flag is a second value (e.g., 0), sps_virtual_boundaries_present_flag is not signaled and the value thereof may be inferred as a second value (e.g., 0).

Figure 14:
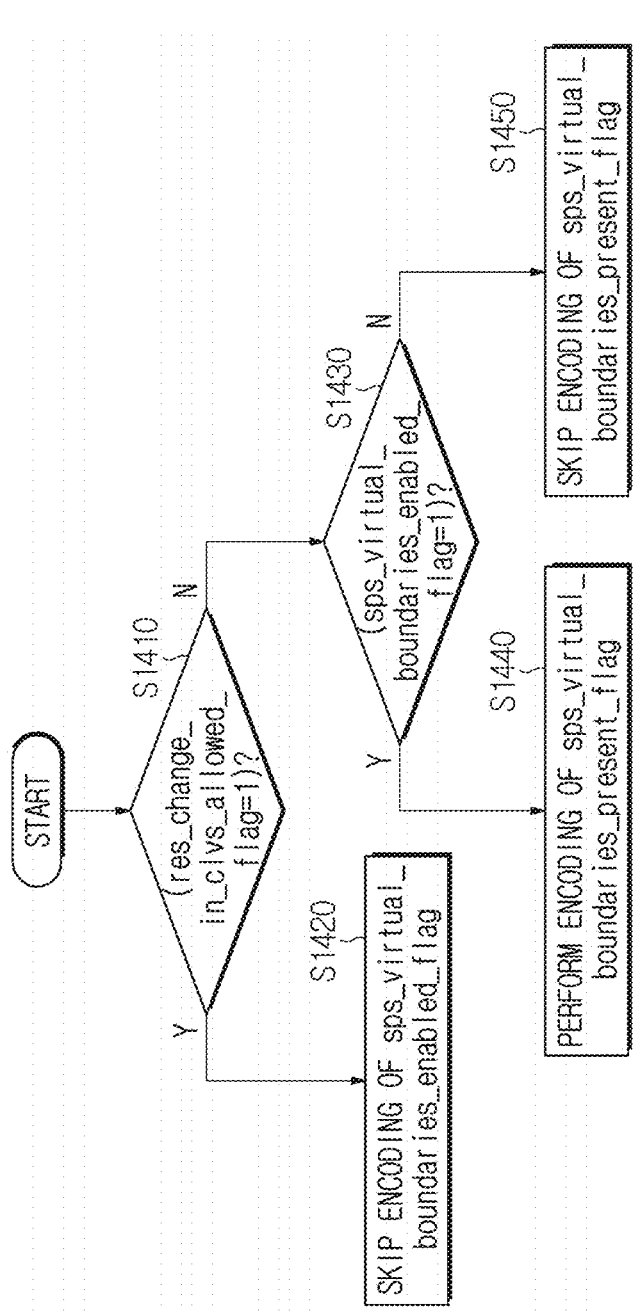
FIG. 14 is a view illustrating a process of encoding sps_virtual_boundaries_enabled_flag and sps_virtual_boundaries_present_flag based on the syntax structure of FIG. 13.

FIG. 14 is a view illustrating a process of encoding sps_virtual_boundaries_enabled_flag and sps_virtual_boundaries_present_flag based on the syntax structure of FIG. 13.

Referring to FIG. 14, whether res_change_in_clvs_allowed_flag represents a first value (e.g., 1) may be determined (S1410). When the above condition is satisfied (S1410—YES), sps_virtual_boundaries_enabled_flag may not be encoded (S1420). When sps_virtual_boundaries_enabled_flag is not encoded, the corresponding value may be inferred as a second value (e.g., 0).

When the condition of step S1410 is not satisfied (S1410—No), sps_virtual_boundaries_enabled_flag may be encoded. Furthermore, whether sps_virtual_boundaries_enabled_flag represents a first value (e.g., 1) is determined (S1430), and, when the condition of step S1430 is satisfied (S1430—YES), sps_virtual_boundaries_present_flag may be encoded (S1440). When the condition of step S1430 is not satisfied (S1430-NO), sps_virtual_boundaries_present_flag may not be encoded (S1450). When sps_virtual_boundaries_present_flag is not encoded, the corresponding value may be inferred as a second value (e.g., 0).

Figure 15:
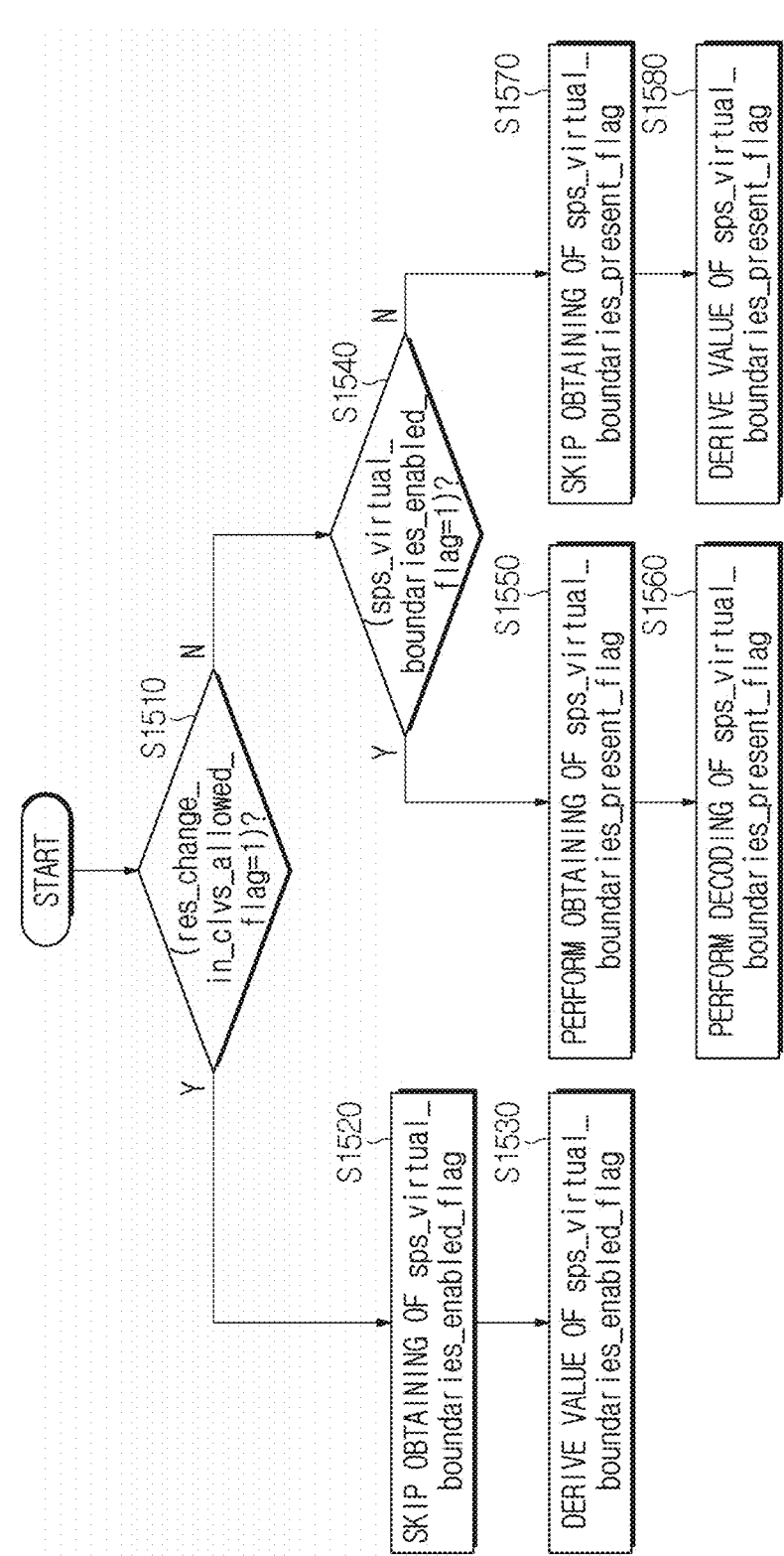
FIG. 15 is a view illustrating a process of decoding sps_virtual_boundaries_enabled_flag and sps_virtual_boundaries_present_flag based on the syntax structure of FIG. 13.

FIG. 15 is a view illustrating a process of decoding sps_virtual_boundaries_enabled_flag and sps_virtual_boundaries_present_flag based on the syntax structure of FIG. 13.

Referring to FIG. 15, whether res_change_in_clvs_allowed_flag is a first value (e.g., 1) may be determined (S1510). When the above condition is satisfied (S1510—YES), sps_virtual_boundaries_enabled_flag may not be obtained from a bitstream (S1520). In addition, the value of sps_virtual_boundaries_enabled_flag may be derived as a second value (e.g., 0) (S1530).

When the condition of step S1510 is not satisfied (S1510-NO), whether sps_virtual_boundaries_enabled_flag represents a first value (e.g., 1) may be determined (S1540). When the condition of step S1540 is satisfied (S1540—YES), sps_virtual_boundaries_present_flag may be obtained from a bitstream (S1550). Decoding may be performed using sps_virtual_boundaries_present_flag (S1560). When the condition of step S1540 is not satisfied (S1540-NO), sps_virtual_boundaries_present_flag may not be obtained from a bitstream (S1570). In addition, sps_virtual_boundaries_present_flag may be derived as a second value (e.g., 0) (S1580).

FIG. 16 is a view illustrating signaling of a syntax element related to resolution change in a CLVS and virtual boundary information according to another embodiment of the present disclosure.

FIG. 16 illustrates an example in which the signaling structure described with reference to FIG. 9 is partially changed.

Accordingly, descriptions of the same parts in FIGS. 9 and 16 will be omitted.

Referring to FIG. 16, sps_virtual_boundaries_present_flag may be conditionally signaled based on sps_virtual_boundaries_enabled_flag and res_change_in_clvs_allowed_flag. For example, when sps_virtual_boundaries_enabled_flag is not a first value (e.g., 1) or res_change_in_clvs_allowed_flag is not a second value (e.g., 0), sps_virtual_boundaries_present_flag may not be signaled. In this case, the corresponding value may be inferred as a second value (e.g., 0). In addition, when sps_virtual_boundaries_enabled_ flag is a first value (e.g., 1) and res_change_in_clvs_allowed_flag is a second value (e.g., 0), sps_virtual_boundaries_present_flag may be signaled.

In the process of encoding sps_virtual_boundaries_present_flag based on FIG. 16, whether sps_virtual_boundaries_enabled_flag represents a first value (e.g., 1) and res_change_in_clvs_allowed_flag represents a second value (e.g., 0) may be determined. When the above condition is satisfied, sps_virtual_boundaries_present_flag may be encoded. When the above condition is not satisfied, sps_virtual_boundaries_present_flag may not be encoded. When sps_virtual_boundaries_present_flag is not encoded, the corresponding value may be inferred as a second value (e.g., 0).

In a process of decoding sps_virtual_boundaries_present_flag based on FIG. 16, whether sps_virtual_boundaries_enabled_flag represents a first value (e.g., 1) and res_change_in_clvs_allowed_flag represents a second value (e.g., 0) may be determined. When the above condition is satisfied, sps_virtual_boundaries_present_flag may be obtained from a bitstream. In addition, decoding may be performed using sps_virtual_boundaries_present_flag. When the above condition is not satisfied, sps_virtual_boundaries_present_flag may not be obtained from a bitstream. In this case, sps_virtual_boundaries_present_flag may be derived as a second value (e.g., 0).

FIG. 17 is a view illustrating changed constraints for syntax elements related to resolution change in a CLVS, a width and height of a picture in units of luma samples and a scaling offset parameter according to the present disclosure.

According to the embodiment of FIG. 17, Constraint 3 may not be applied. That is, even when res_change_in_clvs_allowed_flag is a second value (e.g., 0), pic_width_in_luma_samples and pic_width_max_in_luma_samples may not be the same. In addition, even when res_change_in_clvs_allowed_flag is a second value (e.g., 0), pic_height_in_luma_samples and pic_height_max_in_luma_samples may not be the same.

In addition, according to the embodiment of FIG. 17, Constraint 4 may not be applied. That is, even when res_change_in_clvs_allowed_flag is a second value (e.g., 0), scaling_window_explicit_signalling_flag may not represent a second value (e.g., 0). In addition, when scaling_window_explicit_signalling_flag is a second value (e.g., 0), pic_width_in_luma_samples is equal to pic_width_max_in_luma_samples and pic_height_in_luma_samples is equal to pic_height_max_in_luma_samples, res_change_in_ clvs_allowed_flag may be constrained to be equal to a second value (e.g., 0).

Figures 18, 19:
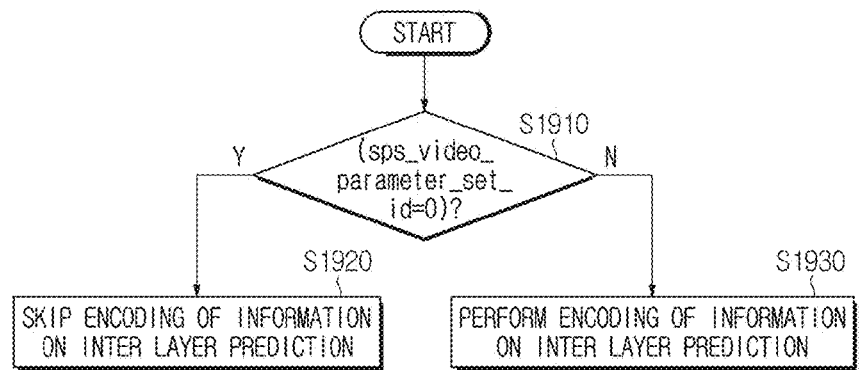
FIG. 18 is a view illustrating signaling of a video parameter and inter layer prediction related to an embodiment of the present disclosure.
FIG. 19 is a view illustrating a process of encoding information on inter layer prediction based on the syntax structure of FIG. 18.

FIG. 18 is a view illustrating signaling of a video parameter and inter layer prediction related to an embodiment of the present disclosure. A video parameter set may include information on multiple layers. For example, video may consist of a plurality of layers. When inter layer prediction is performed, a reference picture may be located at a reference layer other than a current layer in which a current picture is located. Inter layer prediction may mean that, when there is a plurality of layers, current layer information is predicted using other layer information.

FIG. 18 illustrates an example in which the signaling structure described with reference to FIG. 9 is partially changed.

Accordingly, descriptions of the same parts in FIGS. 9 and 18 will be omitted.

Referring to FIG. 18, inter_layer_ref_pics_present_flag may be conditionally signaled based on sps_video_parameter_set_id. For example, when sps_video_parameter_set_id is 0, inter_layer_ref_pics_present_flag may not be signaled. When inter_layer_ref_pics_present_flag is not signaled, the corresponding value may be inferred as a second value (e.g., 0). sps_video_parameter_set_id being 0 may mean that a video parameter set referenced by the SPS is not present. In addition, since the video parameter set includes information on multiple layers, sps_video_parameter_set_id being 0 may mean that inter layer prediction is not performed with respect to the corresponding sequence. Accordingly, when sps_video_parameter_set_id is 0, by not signaling information on inter layer prediction, the amount of transmitted information may be reduced and accurate signaling may be performed.

In addition, when sps_video_parameter_set_id is not 0, for example, is greater than 0, inter_layer_ref_pics_present_flag may be signaled. sps_video_parameter_set_id being not 0 (being greater than 0) may mean that a video parameter set referenced by the SPS is present. In addition, since a video parameter set includes information on multiple layers, sps_video_parameter_set_id being not 0 (being greater than 0) may mean that inter layer prediction may be performed with respect to the corresponding sequence. Accordingly, when sps_video_parameter_set_id is not 0 (is greater than 0), information on inter layer prediction may be signaled.

FIG. 19 is a view illustrating a process of encoding information on inter layer prediction based on the syntax structure of FIG. 18.

Referring to FIG. 19, whether sps_video_parameter_set_id is 0 may be determined (S1910). When the above condition is satisfied (S1910—YES), information (e.g., inter_layer_ref_pics_present_flag) on inter layer prediction may not be encoded (S1920). In this case, for example, inter_layer_ref_pics_present_flag may be inferred as a second value (e.g., 0)).

When the condition of step S1910 is not satisfied (S1910—No), that is, when sps_video_parameter_set_id is not 0 (is greater than 0), information (e.g., inter_layer_ref_pics_present_flag) on inter layer prediction may be encoded (S1930).

Figure 20:
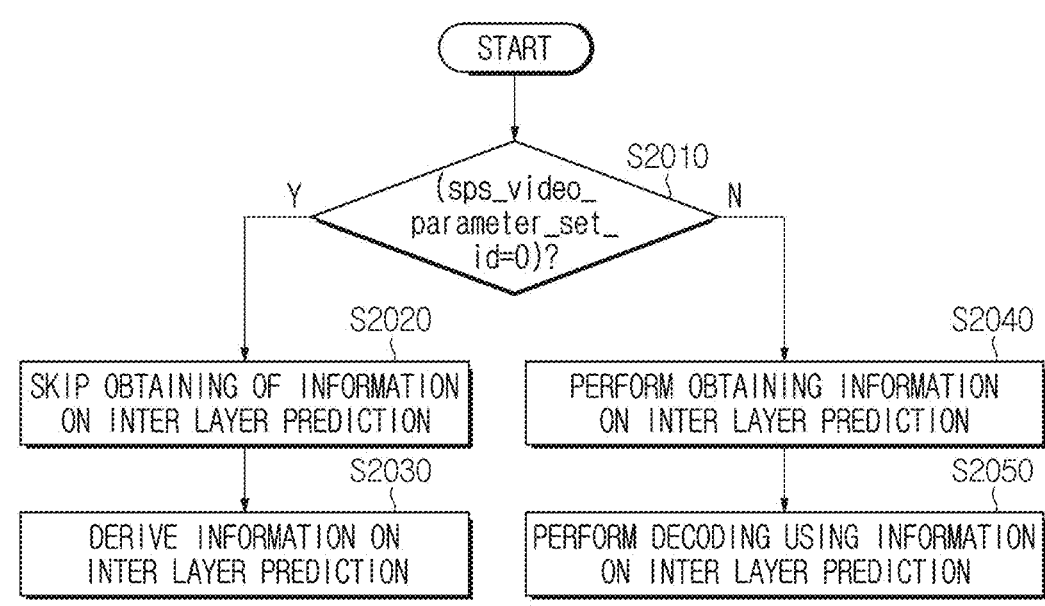
FIG. 20 is a view illustrating a process of decoding information on inter layer prediction based on the syntax structure of FIG. 18.

FIG. 20 is a view illustrating a process of decoding information on inter layer prediction based on the syntax structure of FIG. 18.

Referring to FIG. 20, whether sps_video_parameter_set_id is 0 may be determined (S2010). When the above condition is satisfied (S2010—YES), information (e.g., inter_layer_ref_pics_present_flag) on inter layer prediction may not be obtained from a bitstream (S2020). In this case, for example, inter_layer_ref_pics_present_flag may be derived as a second value (e.g., 0) (S2030).

When the condition of step S2010 is not satisfied (S2010—No), information (e.g., inter_layer_ref_pics_present_flag) on inter layer prediction may be obtained from the bitstream (S2040). In addition, decoding may be performed using the obtained information (S2050).

As described above, since the video parameter set includes information on multiple layers, when a video parameter set referenced by the SPS is present, inter layer prediction may be performed with respect to a current sequence and, when the video parameter set referenced by the SPS is not present, inter layer prediction is not performed with respect to the current sequence. Accordingly, information on inter layer prediction needs to be conditionally signaled based on whether the video parameter set is present. More specifically, whether the referenced video parameter set is present may be determined based on whether sps_video_parameter_set_id is 0 or not (has a value greater than 0). When sps_video_parameter_set_id is 0, the referenced video parameter set is not present and information on inter layer prediction is not signaled. Otherwise, the referenced video parameter set may be present and information on inter layer prediction may be signaled. Accordingly, according to the embodiment described with reference to FIGS. 18 to 20, by conditionally signaling the information on inter layer prediction based on whether the video parameter set referenced by the SPS is present, it is possible to reduce the amount of transmitted information and to perform more efficient and accurate signaling.

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some steps.

In the present disclosure, the image encoding apparatus or the image decoding apparatus that performs a predetermined operation (step) may perform an operation (step) of confirming an execution condition or situation of the corresponding operation (step). For example, if it is described that predetermined operation is performed when a predetermined condition is satisfied, the image encoding apparatus or the image decoding apparatus may perform the predetermined operation after determining whether the predetermined condition is satisfied.

The various embodiments of the present disclosure are not a list of all possible combinations and are intended to describe representative aspects of the present disclosure, and the matters described in the various embodiments may be applied independently or in combination of two or more.

Various embodiments of the present disclosure may be implemented in hardware, firmware, software, or a combination thereof. In the case of implementing the present disclosure by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

In addition, the image decoding apparatus and the image encoding apparatus, to which the embodiments of the present disclosure are applied, may be included in a multimedia broadcasting transmission and reception device, a mobile communication terminal, a home cinema video device, a digital cinema video device, a surveillance camera, a video chat device, a real time communication device such as video communication, a mobile streaming device, a storage medium, a camcorder, a video on demand (VOD) service providing device, an OTT video (over the top video) device, an Internet streaming service providing device, a three-dimensional (3D) video device, a video telephony video device, a medical video device, and the like, and may be used to process video signals or data signals. For example, the OTT video devices may include a game console, a blu-ray player, an Internet access TV, a home theater system, a smartphone, a tablet PC, a digital video recorder (DVR), or the like.

Figure 21:
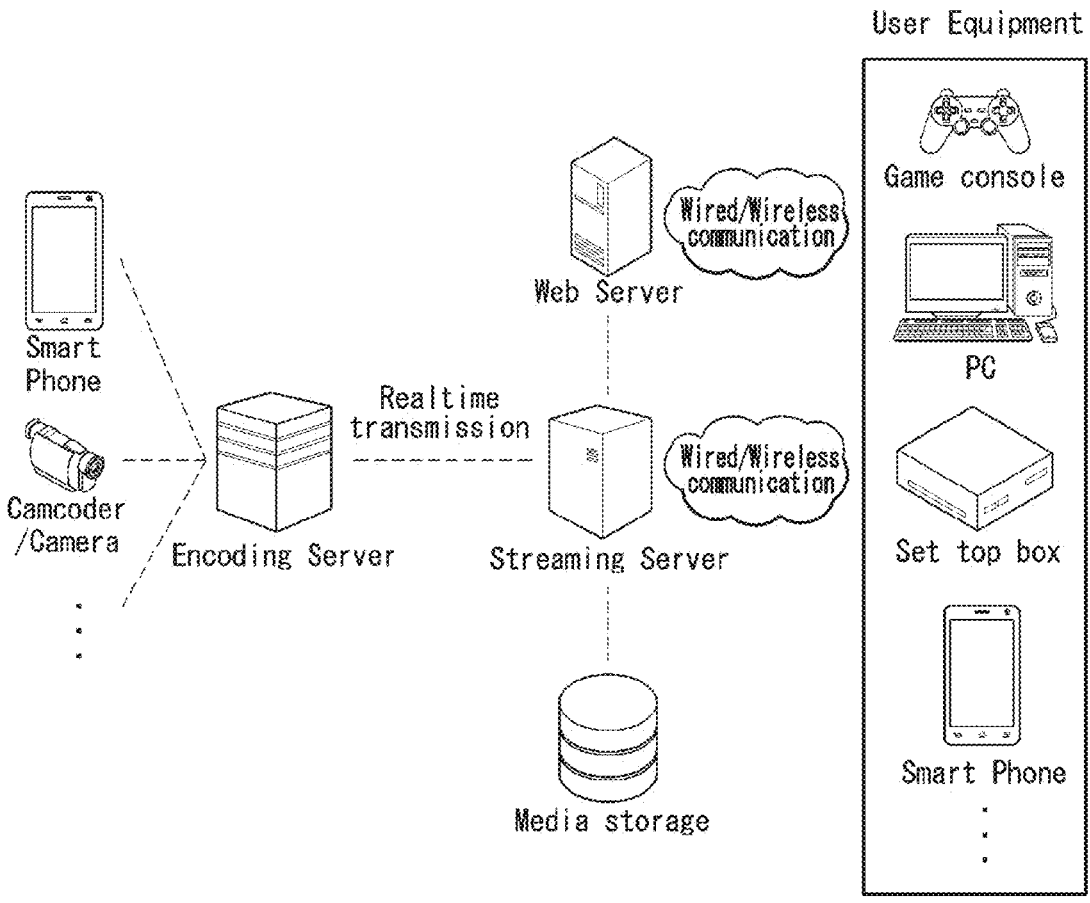
FIG. 21 is a view showing a content streaming system, to which an embodiment of the present disclosure is applicable.

FIG. 21 is a view showing a content streaming system, to which an embodiment of the present disclosure is applicable.

As shown in FIG. 21, the content streaming system, to which the embodiment of the present disclosure is applied, may largely include an encoding server, a streaming server, a web server, a media storage, a user device, and a multimedia input device.

The encoding server compresses contents input from multimedia input devices such as a smartphone, a camera, a camcorder, etc. into digital data to generate a bitstream and transmits the bitstream to the streaming server. As another example, when the multimedia input devices such as smartphones, cameras, camcorders, etc. directly generate a bitstream, the encoding server may be omitted.

The bitstream may be generated by an image encoding method or an image encoding apparatus, to which the embodiment of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server may deliver it to a streaming server, and the streaming server may transmit multimedia data to the user. In this case, the content streaming system may include a separate control server. In this case, the control server serves to control a command/response between devices in the content streaming system.

The streaming server may receive contents from a media storage and/or an encoding server. For example, when the contents are received from the encoding server, the contents may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the content streaming system may be operated as a distributed server, in which case data received from each server may be distributed.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

INDUSTRIAL APPLICABILITY

The embodiments of the present disclosure may be used to encode or decode an image.

The invention claimed is:

1. An image decoding method performed by an image decoding apparatus, the image decoding method comprising:

determining whether a video parameter set (VPS) referred to by a sequence parameter set (SPS) is present based on an identifier value of the video parameter set referred to by the sequence parameter set;

deriving information on inter layer prediction, based on the determination as to whether the video parameter set referred to by the sequence parameter set is present; and reconstructing an image based on the information on inter layer prediction, wherein, based on the determination result that the video parameter set referred to by the sequence parameter set is not present, the information on inter layer prediction is not obtained from a bitstream, wherein, based on the determination result that the video parameter set referred to by the sequence parameter set is present, the information on inter layer prediction is obtained from the bitstream, wherein, based on the identifier value of the video parameter set referred to by the sequence parameter set being greater than 0, it is determined that the video parameter set referred to by the sequence parameter set is present, and wherein the identifier value of the video parameter set referred to by the sequence parameter set is determined by information obtained from the sequence parameter set.

2. The image decoding method of claim 1, wherein, based on the identifier value of the video parameter set referred to by the sequence parameter set being 0, it is determined that the video parameter set referred to by the sequence parameter set is not present.

3. The image decoding method of claim 1, wherein, based on the determination result that the video parameter set referred to by the sequence parameter set is not present, the information on inter layer prediction is derived as a predetermined value.

4. An image encoding method performed by an image encoding apparatus, the image encoding method comprising:

determining whether a video parameter set (VPS) referred to by a sequence parameter set (SPS) is present;

deriving information on inter layer prediction based on the determination as to whether the video parameter set referred to by the sequence parameter set is present; and encoding the information on inter layer prediction, wherein, based on the determination result that the video parameter set referred to by the sequence parameter set is not present, the information on inter layer prediction is not encoded, wherein, based on the determination result that the video parameter set referred to by the sequence parameter set is present, the information on inter layer prediction is encoded, wherein an identifier value of the video parameter set referred to by the sequence parameter set is determined based on the determination as to whether the video parameter set referred to by the sequence parameter set is present, wherein, based on the determination result that the video parameter set referred to by the sequence parameter set being present, the identifier value of the video parameter set referred to by the sequence parameter set has greater than 0, and wherein information specifying the identifier value of the video parameter set referred to by the sequence parameter set is encoded into the sequence parameter set.

5. The image encoding method of claim 4, wherein, wherein, based on the determination result that the video parameter set referred to by the sequence parameter set not being present, the identifier value of the video parameter set referred to by the sequence parameter set has 0.

6. The image encoding method of claim 4, wherein, based on the determination result that the video parameter set referred to by the sequence parameter set is not present, the information on inter layer prediction is derived as a predetermined value.

7. A non-transitory computer-readable recording medium storing a bitstream generated by the image encoding method of claim 4.

8. A method of transmitting a bitstream generated by an image encoding method, the image encoding method comprising:

determining whether a video parameter set (VPS) referred to by a sequence parameter set (SPS) is present;

deriving information on inter layer prediction based on the determination as to whether the video parameter set referred to by the sequence parameter set is present; and encoding the information on inter layer prediction, wherein, based on the determination result that the video parameter set referred to by the sequence parameter set is not present, the information on inter layer prediction is not encoded, wherein, based on the determination result that the video parameter set referred to by the sequence parameter set is present, the information on inter layer prediction is encoded, wherein an identifier value of the video parameter set referred to by the sequence parameter set is determined based on the determination as to whether the video parameter set referred to by the sequence parameter set is present, wherein, based on the determination result that the video parameter set referred to by the sequence parameter set being present, the identifier value of the video parameter set referred to by the sequence parameter set has greater than 0, and wherein information specifying the identifier value of the video parameter set referred to by the sequence parameter set is encoded into the sequence parameter set.

* * * * *